US011321422B1

(12) United States Patent
Stone et al.

(10) Patent No.: US 11,321,422 B1
(45) Date of Patent: May 3, 2022

(54) USER-CONFIGURABLE AGGREGATE WEB COMPONENTS

(71) Applicant: salesforce.com, inc., San Francisco, CA (US)

(72) Inventors: David Stone, San Francisco, CA (US); Peter Thorson, Danville, CA (US); Diego J. Garcia, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/196,835

(22) Filed: Mar. 9, 2021

(51) Int. Cl.
*G06F 16/958* (2019.01)
*G06F 16/2457* (2019.01)
*G06F 16/957* (2019.01)
*G06F 3/0486* (2013.01)

(52) U.S. Cl.
CPC .......... *G06F 16/986* (2019.01); *G06F 3/0486* (2013.01); *G06F 16/24573* (2019.01); *G06F 16/9577* (2019.01)

(58) Field of Classification Search
CPC ... G06F 16/986; G06F 16/9577; G06F 3/0486
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

FOREIGN PATENT DOCUMENTS

CA        2720114 A1 *  10/2009   ............. G06F 16/26

OTHER PUBLICATIONS

David Stone, et al., Process Flow Builder for User-Configurable Web Component Sequences, U.S. Appl. No. 17/248,607, filed Jan. 29, 2021.

(Continued)

*Primary Examiner* — Asher D Kells
(74) *Attorney, Agent, or Firm* — LKGlobal | Lorenz & Kopf, LLP

(57) ABSTRACT

Database systems and methods are provided for visual design and customization of processes for web applications. A method involves providing a page builder graphical user interface (GUI) display at a client device over a network, obtaining a configured set of configurable web components added to an aggregate component region on the page builder GUI display, generating behavioral code corresponding to the configured set of configurable web components, generating presentation code corresponding to a spatial arrangement of the configured set of the configurable components within the aggregate component region, creating an aggregate component object in a database to maintain an association between the presentation code and the behavioral code for the configured set of the configurable components, and updating code for the web page to include a reference to the aggregate component object at the aggregate component region of the web page.

20 Claims, 16 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0136320 A1* | 6/2007 | Sah .......... G06Q 30/02 |
| 2007/0162845 A1* | 7/2007 | Cave .......... G06F 40/117 |
| | | 715/209 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0169755 A1* | 7/2010 | Zafar .......... G06Q 10/00 |
| | | 715/205 |
| 2011/0023017 A1* | 1/2011 | Calvin .......... G06F 16/986 |
| | | 717/120 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2012/0290940 A1* | 11/2012 | Quine .......... G06F 16/212 |
| | | 715/744 |
| 2012/0290955 A1* | 11/2012 | Quine .......... G06F 8/34 |
| | | 715/763 |
| 2012/0290959 A1* | 11/2012 | Quine .......... G06F 3/0482 |
| | | 715/765 |
| 2012/0291005 A1* | 11/2012 | Quine .......... G06F 8/00 |
| | | 717/105 |
| 2012/0291006 A1* | 11/2012 | Quine .......... G06F 9/45529 |
| | | 717/105 |
| 2012/0291011 A1* | 11/2012 | Quine .......... G06F 9/45512 |
| | | 717/115 |

(56) References Cited

U.S. PATENT DOCUMENTS

| | | | |
|---|---|---|---|
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2014/0258836 A1* | 9/2014 | Horton | G06F 8/38 715/234 |
| 2014/0258837 A1* | 9/2014 | Horton | G06F 3/0486 715/234 |
| 2015/0012818 A1* | 1/2015 | Reichmann | G06F 40/166 715/236 |
| 2015/0020006 A1* | 1/2015 | Kotzer | G06F 16/9577 715/762 |
| 2015/0212989 A1* | 7/2015 | Rice | G06F 16/986 715/234 |
| 2016/0092176 A1* | 3/2016 | Straub | G06F 8/38 717/107 |
| 2017/0103044 A1* | 4/2017 | Baldwin | G06F 40/106 |
| 2017/0351656 A1* | 12/2017 | Lysanov | G06F 40/186 |
| 2018/0075250 A1 | 3/2018 | Chasman et al. | |
| 2019/0235984 A1 | 8/2019 | Joshi et al. | |
| 2020/0097161 A1* | 3/2020 | Gonzalez | G06F 3/0482 |
| 2020/0372206 A1* | 11/2020 | Fialkow | G06F 8/34 |
| 2021/0216190 A1* | 7/2021 | Vakil | G06F 16/953 |

OTHER PUBLICATIONS

David Stone, et al, Aggregate Component for Parallel Browser-Initiated Actions, U.S. Appl. No. 17/249,240, filed Feb. 24, 2021.

* cited by examiner

Action Properties — 1400

Action Type
Event
☑ Enable Tracking
*Event Type
PubSub
*Channel Name
Flex_Profile3
*Event Name
data
Input Parameters + Add New Save

FIG. 14

USER-CONFIGURABLE AGGREGATE WEB COMPONENTS

TECHNICAL FIELD

One or more implementations relate to the field of database systems, and more specifically, to declarative, drag and drop customizations of data-driven applications.

BACKGROUND

Modern software development has evolved towards web applications or cloud-based applications that provide access to data and services over the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware.

Multi-tenant cloud-based architectures have been developed to support multiple user groups (also referred to as "organizations" or "tenants") using a common hardware and software platform. Some multi-tenant database systems include an application platform that supports a customizable user experience, for example, to create custom applications, web pages, reports, tables, functions, and/or other objects or features. However, creating customizations can be difficult and time-consuming for users who are relatively inexperienced with computer programming or are otherwise unfamiliar with the platform(s) of the multi-tenant system.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIGS. 3-14 depict a sequence of web page graphical user interface (GUI) displays suitable for presentation on a client device by a web page design service in the computing system of FIG. 1 according to some example implementations;

DETAILED DESCRIPTION

Figure 1:
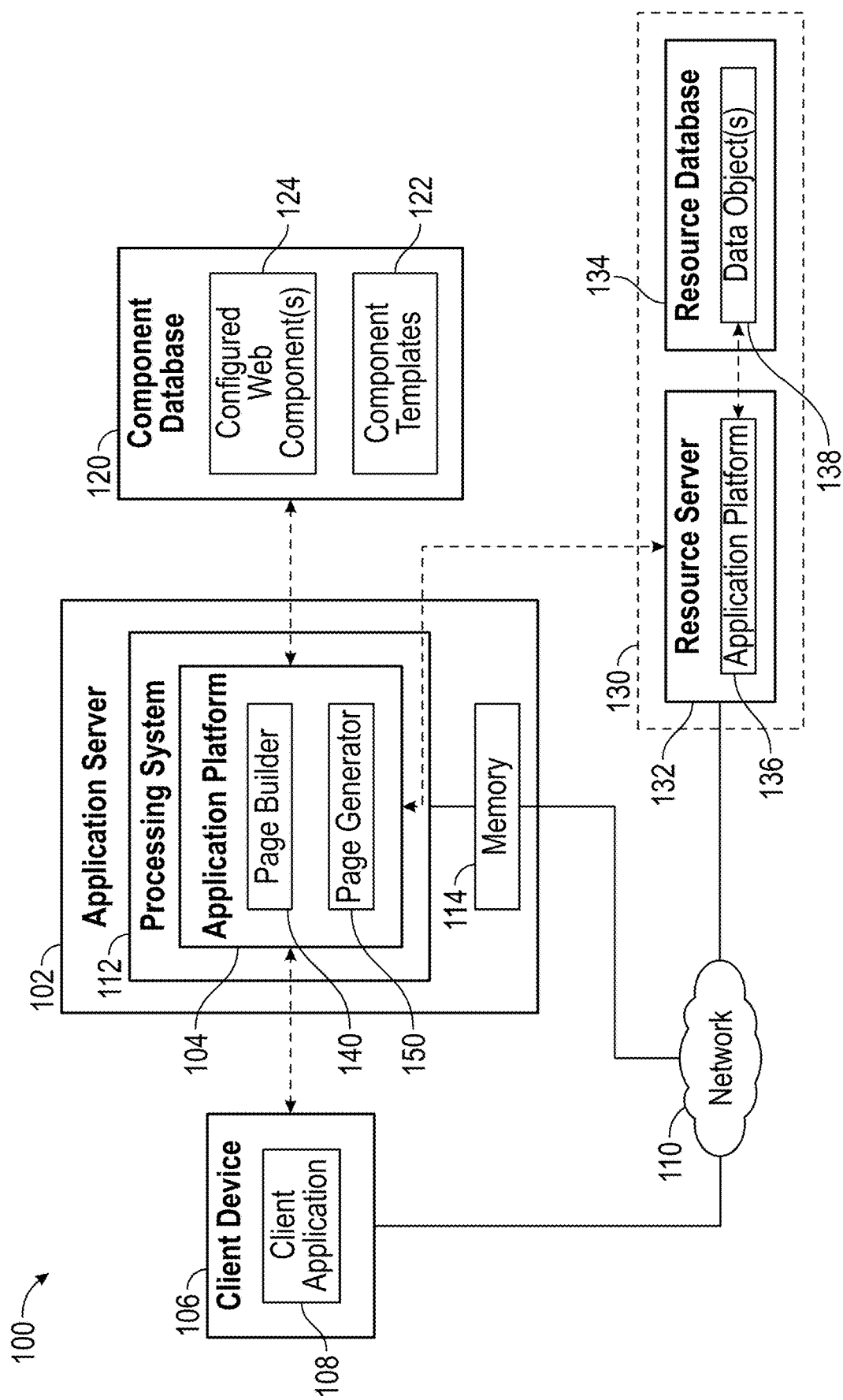
FIG. 1 is a block diagram illustrating a computing system according to some example implementations.

The subject matter described herein generally relates to allowing users to define sequences of graphical user interface (GUI) displays and actions for a web application in a visual, WYSIWYG, drag and drop, declarative, and low code (or no code) manner using user-configurable web components. In exemplary implementations, a page builder GUI display is provided that includes a web page editing region where a user may populate an aggregate web component by dragging and dropping instances of configurable web components within the aggregate web component region of the page builder GUI display. The user inputs, defines, or otherwise configures values for attributes, properties or fields associated with those constituent web components for automatically populating or otherwise generating content for those constituent web components at run-time. In this regard, the constituent web components are automatically populated in accordance with the user configuration utilizing data retrieved from a particular data source that is selected or otherwise configured by the user for the respective constituent web component. Additionally, the page builder GUI display allows the user to adjust the size, shape, position and/or other visual characteristics of the constituent web components and spatially arrange the constituent web components relative to one another within the aggregate web component region.

As described in greater detail below, a configured aggregate web component object is created that includes autogenerated code for providing a desired behavior for the aggregate web component and for rendering or otherwise presenting the respective constituent web components relative to one another within the aggregate web component in accordance with the user's configuration(s) of the respective constituent web components. In this regard, the configured aggregate web component may be added or incorporated into a region of a web page, with that aggregate web component region of the web page being automatically populated by rendering the constituent web components with the desired spatial arrangement within the aggregate web component region. For each constituent web component, a configured web component object maintains the autogenerated code for effectuating the respective web component in association with user input values for various metadata fields associated with the respective web component. In some implementations, the user configuration may include one or more uniform resource locator (URL) addresses or other network locations for a remote data source from which data is to be retrieved at run-time to automatically generate, render, or otherwise implement the respective web component in a manner that may vary dynamically based on the current state of the data at the remote data source. In a similar manner, the configured aggregate web component object maintains autogenerated code for rendering the constituent web components at the desired locations within the aggregate web component region in association with metadata that identifies the respective web component to be rendered at a desired location within the aggregate web component region. Code of a web page file for a web application may be updated or modified to include reference to the configured aggregate web component object at a desired location within the web page to render the aggregate web component region at the desired location within the web page GUI display, where the contents of the aggregate web component region may be automatically generated at run-time and dynamically vary according to the number, type and configuration of constituent web components within the aggregate web component region.

FIG. 1 depicts an exemplary computing system 100 for providing user-configurable custom web applications over a network that is capable of supporting a page builder GUI display and related web page design services described herein. It should be appreciated that FIG. 1 depicts a simplified representation of the system 100 for purposes of explanation and is not intended to be limiting.

The illustrated system 100 includes an application server 102 that generally represents a server computing device, server computing system or another combination of processing logic, circuitry, hardware, and/or other components configured to support the processes, tasks, operations, and/or functions described herein. In this regard, the application server 102 supports an application platform 104 configurable to provide instances of one or more web applications within client applications 108 executed on client devices 106 communicatively coupled to the application server 102 via a communications network 110, such as the Internet or any sort or combination of wired and/or wireless computer network, a cellular network, a mobile broadband network, a radio network, or the like. The application server 102 generally includes a processing system 112, which may be implemented using any suitable processing system and/or device, such as, for example, one or more processors, central processing units (CPUs), controllers, microprocessors, microcontrollers, processing cores and/or other hardware computing resources configured to support the operation of the processing system described herein. The processing system 112 may include or otherwise access a data storage element 114 (or memory) capable of storing programming instructions for execution by the processing system, that, when read and executed, are configurable cause processing system 112 to create, generate, or otherwise facilitate the application platform 104 that generates or otherwise provides instances of a web application at run-time (or "on-demand") based at least in part upon code and other data that is stored or otherwise maintained by the memory 114, a component database 120, or a remote location on the network 110 (e.g., at an external computing system 130). Depending on the implementation, the memory may be realized as a random access memory (RAM), read only memory (ROM), flash memory, magnetic or optical mass storage, or any other suitable non-transitory short or long term data storage or other computer-readable media, and/or any suitable combination thereof.

The client device 106 generally represents an electronic device coupled to the network 110 that may be utilized by a user to access and utilize an instance of a web application generated by the application platform 104 on the application server 102. In practice, the client device 106 can be realized as any sort of personal computer, mobile telephone, tablet, or other network-enabled electronic device. In exemplary implementations, the client device 106 includes a display device, such as a monitor, screen, or another conventional electronic display, capable of graphically presenting data and/or information provided by the web application along with a user input device, such as a touchscreen, a touch panel, a mouse, a joystick, a directional pad, a motion sensor, or the like, capable of receiving input from the user of the client device 106. The illustrated client device 106 executes or otherwise supports a client application 108 that communicates with the application platform 104 on the application server 102 using a networking protocol. In some implementations, the client application 108 is realized as a web browser or similar local client application executed by the client device 106 that contacts the application server 102 and/or the application platform 104 using a networking protocol, such as the hypertext transport protocol (HTTP) or the like, to access or otherwise initiate an instance of the web application being presented on the client device 106 (e.g., by or within the client application 108). For purposes of explanation, but without limitation, the client application 108 may alternatively be referred to herein as a browser application or web browser.

In one or more implementations, the application platform 104 is configurable to facilitate or generate an instance of a web application at run-time or on-demand using configured web components 124 associated with the web application that are maintained in the component database 120 coupled to the application server 102. As described in greater detail below, the configured web components 124 are created, defined, or otherwise configured by a developer, creator, administer or other operator associated with the web application, who inputs, selects, configures or otherwise defines values for fields or parameters for instances of web component templates 122 that have been added or selected for integration with a particular web page associated with the web application. For example, a developer of a web application may configure an HTTP action, define a network address or provide other information for one or more fields of an instance of a web component template 122 added to a web page of the web application, which, in turn, may be utilized by the application platform 104 and/or a browser application 108 to retrieve data from an external computing system 130 over the network 110 for incorporation within the web application by populating or otherwise generating the instance of the configured web component 124 using the retrieved data at run-time or on-demand.

In the illustrated implementation depicted in FIG. 1, the external computing system 130 is realized as a database system that includes a resource server 132 communicatively coupled to the network 110 to support access to files, records, data, information, or other resources maintained in a resource database 134. In this regard, the resource server 132 generally represents a server computing device, server computing system or another combination of processing logic, circuitry, hardware, and/or other components configured to support remote access to data maintained in the resource database 134 via the network 110. In one or more implementations, the external computing system 130 is physically and logically distinct from the application server 102, for example, by residing at a different physical location than the application server 102. Additionally, the external computing system 130 may be owned, controlled, or otherwise operated by a third party that is different from the party that owns, controls and/or operates the application server 102 and/or the party that developed or is otherwise associated with the web application. That said, in some implementations, the external computing system 130 may be affiliated with the same party that owns, controls and/or operates the application server 102 and/or the application platform 104.

In one or more implementations, the external computing system 130 is realized as an on-demand multi-tenant database system that is capable of dynamically creating and supporting virtual applications based upon data from a common database 134 that is shared between multiple tenants, which may alternatively be referred to herein as a multi-tenant database. In accordance with one non-limiting example, the external computing system 130 is implemented in the form of an on-demand multi-tenant customer relationship management (CRM) system that can support any number of authenticated users of multiple tenants, for example, by providing, to any number of client devices, data and services generated by virtual applications at run-time (or on-demand) using a common application platform 136 that securely provides access to files, records, resources or other data objects 138 in the database 134 for each of the various tenants subscribing to the multi-tenant system. In this regard, one or more implementations of the external computing system 130 support one or more application program interfaces (APIs) at the resource server 132 that allow authorized and authenticated actors (e.g., the application server 102, the application platform 104, etc.) to retrieve or access data maintained in the database 134 that would otherwise be secured and inaccessible to unauthorized parties.

Still referring to FIG. 1, in exemplary implementations, the processing system 112 executes programming instructions that are configurable cause the application platform 104 to create, generate, or otherwise facilitate a visual web page design application 140 (or visual page builder) capable of providing a web page builder graphical user interface (GUI) display within a client application 108 at a client device 106 that allows a user to design or otherwise create web applications and corresponding web page GUI displays using the user-configurable web component templates 122 in a visual, drag and drop manner. Additionally, in one or more implementations, the processing system 112 executes programming instructions that are configurable cause the application platform 104 to create, generate, or otherwise facilitate a page generator application 150 capable of generating one or more web page GUI displays corresponding to a web application created or otherwise developed by a user using the visual page builder 140 based on the configured web components 124 associated with the web application. In this regard, the page generator application 150 may be configurable to cause the client application 108 to retrieve and render the configured web components 124 at run-time in accordance with the user-defined configuration of the web application to thereby provide an instance of the web application within the client application 108 at the client device 106.

The configurable web component templates 122 generally represent self-contained and reusable elements or other resources that may be added or otherwise incorporated into a web page and generated or otherwise rendered at run-time in accordance with user-defined or user-configured values for various metadata fields or parameters of the respective web component template 122. For example, the configurable web component templates 122 may correspond to configurable web components for various GUI elements, such as buttons, text boxes, lists, menus, and/or the like, which may be added to a web page GUI display in a drag and drop manner and then manually configured by a developer user. In some implementations, a web component template 122 may include or otherwise have associated therewith one or more application programming interfaces that are configurable by a developer user to modify internal implementation details of the component to be opaque to a user of the component.

After a developer user utilizes the page builder GUI display to add instances of web component templates 122 to a web page and define values for the fields associated with the respective web component templates 122, the visual page builder 140 and/or the application platform 104 are configurable to generate and store configured instances of the web component templates 122 in the component database 120 as configured web components 124 associated with the web application that maintains the user-defined values for the respective instances of the web component templates 122 in association with the other code and/or data defining the layout, rendering, or behavior of the respective web component templates 122. For example, a configured web component 124 may include presentation code (e.g., Hypertext Markup Language (HTML), cascading style sheet (CSS), and/or the like) defining the manner in which the configured web component 124 is to be displayed, rendered or otherwise presented by the client application 108. The configured web component 124 may also include behavioral code (e.g., JavaScript or other client-side executable code) defining the event-driven behavior of the configured web component 124 within the client application 108 (e.g., in response to user actions, server actions, an event associated with another web component, etc.). The configured web component 124 also includes the user-defined metadata values for the configured web component 124 which may be invoked, referenced, or otherwise utilized by the presentation code and/or behavioral code to generate and render the configured web component 124. Accordingly, the configured web components 124 may be dynamic, with the content and/or behavior thereof varying each time a web page GUI display including one or more configured web component(s) 124 is viewed or accessed, for example, depending on the user of a client device 106 accessing the web application or other contextual information, in response to changes to data referenced and/or invoked by the configured web component(s) 124, and/or the like.

Figure 2:
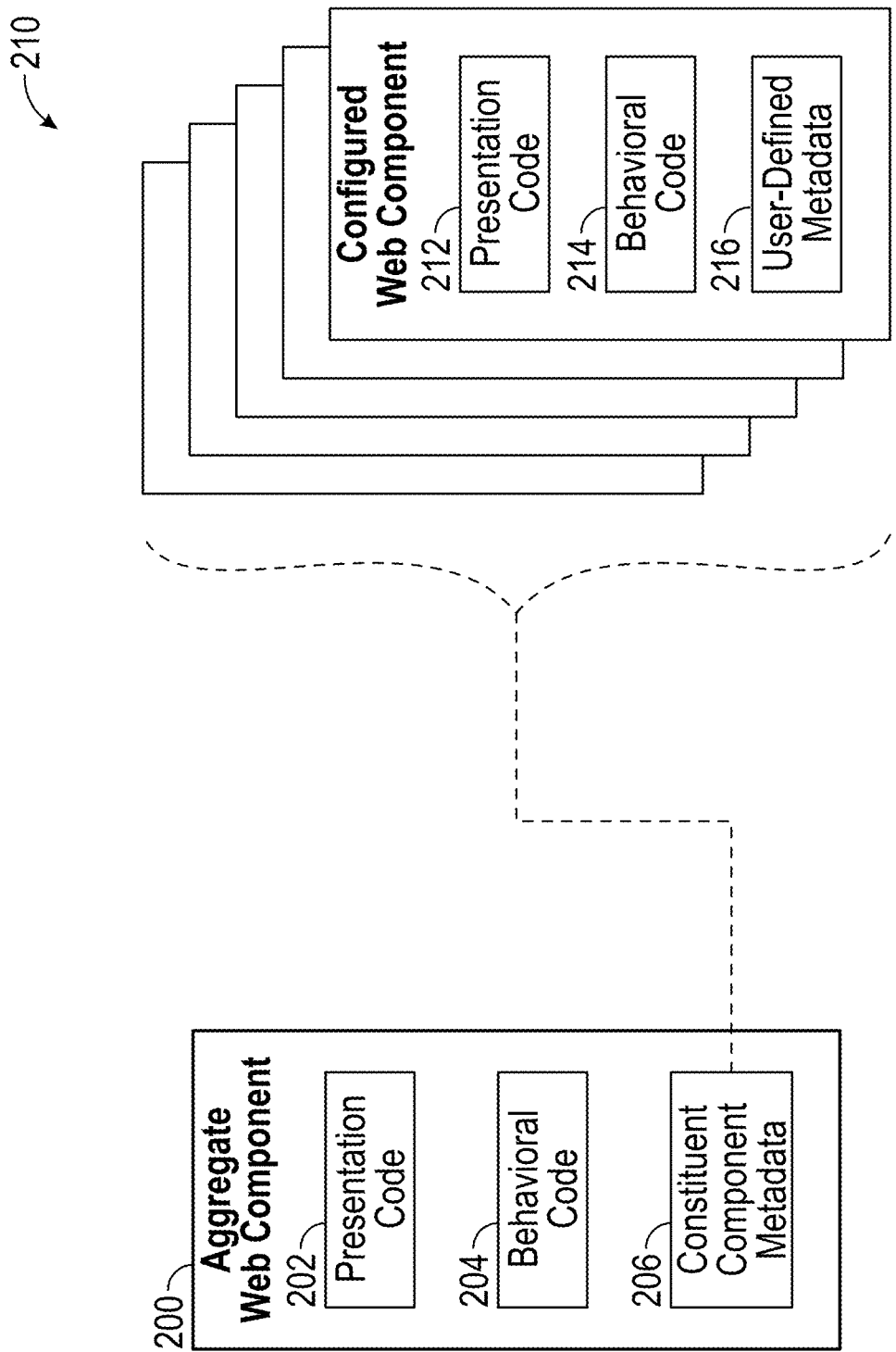
FIG. 2 is a block diagram illustrating an aggregate web component suitable for use with the computing system of FIG. 1 according to some example implementations.

Referring now to FIG. 2 with continued reference to FIG. 1, in exemplary implementations described herein, visual page builder 140 is configurable to allow a developer user to utilize the page builder GUI display to create or otherwise define configured web components 124 associated with a web application that include an aggregate web component 200 for incorporation within a web page associated with the web application that invokes or otherwise references user-defined constituent web components 210 for populating the aggregate web component within the web page GUI display. In this regard, the configured aggregate web component 200 includes HTML code or other presentation code 202 that defines the layout, graphical structure or other visual characteristics of the aggregate web component 200 and the spatial arrangement of the constituent web components 210 contained therein along with JavaScript code or other client-side executable behavioral code 204 that defines the event-driven behavior associated with the aggregate web component 200. In this regard, the configured aggregate web component 200 also includes metadata that identifies the configured constituent web components 210 to be incorporated or otherwise integrated into the aggregate web component 200 according to the spatial arrangement or layout defined by the developer user associated with the web application. In this regard, the presentation code 202 may reference or otherwise utilize the constituent component metadata 206 to invoke and render the configured constituent web components 210 within the aggregate component region of the web page GUI display in accordance with the user-defined positioning and spatial arrangement of the constituent web components 210.

When rendering a web page GUI display based on a URL or web page file of a web application that includes reference to the aggregate web component 200, the client application 108 retrieves and executes the presentation code 202 to generate the aggregate web component 200 within the web page GUI display associated with the web application by utilizing the constituent component metadata 206 to retrieve and render the configured constituent web components 210 to populate the aggregate web component region of the web page GUI display. In this regard, each of the configured web components 210 that are incorporated into the aggregate web component object 200 includes HTML, code or other presentation code 212 defining the manner in which the configured web component 210 is to be displayed or rendered, JavaScript or other client-side executable behavioral code 214 defining the event-driven behavior of the configured web component 210, and user-defined metadata 216 including values or properties that are input or otherwise defined by the developer user for various fields, parameters, variables or other attributes associated with the respective web component 210. Accordingly, the client application 108 retrieves and executes the presentation code 212 and behavioral code 214 to dynamically render each respective constituent web component 210 at the desired location within the aggregate web component region in accordance with the metadata 216 defined for the respective web component 210.

As described in greater detail below, in exemplary implementations, a page builder GUI display allows the developer user to add instances of web component templates 122 to an aggregate component region of the page builder GUI display in a visual, drag and drop manner, and then define metadata values or properties to be associated with the corresponding configured web components 210 added to the aggregate component region. For each instance of web component template 122 added to the aggregate component region, the visual page builder 140 automatically generates or otherwise creates the presentation code 212 and behavioral code 214 for the corresponding configured web component 124, 210 based on the component type associated with the web component template 122 and the user-defined metadata values 216 to be associated with the configured web component 124, 210 and then stores the data object maintaining the association between the presentation code 212, the behavioral code 214, and the user-defined values 216 associated with the configured web component 124, 210 in the component database 120. The metadata 216 may also include default values or parameters defined by a respective component template 122 or other values that are not defined by a user, such as, for example, a label, a field data type, placeholder text, conditional display criteria (e.g., show/hide), and the like. The visual page builder 140 also automatically generates or otherwise creates the presentation code 202 and behavioral code 204 for the configured aggregate web component 124, 200 based on the visual layout of constituent web components 210 within the aggregate component region and other user configurations associated with the aggregate component region and stores a configured aggregate component data object 124, 200 in the database 120 that maintains the association between the aggregate component presentation code 202, the aggregate component behavioral code 204, and the metadata 206 identifying the configured constituent web components 124, 210 in the component database 120 that are associated with the aggregate component data object 124, 200.

When a user of a client device 106 navigates a browser or similar client application 108 to a uniform resource locator (URL) address associated with the web application that includes a reference to the configured aggregate web component 124, 200, the client application 108 may retrieve or otherwise obtain the configured aggregate web component 124, 200 via the page generator application 150 and process or otherwise execute the aggregate component HTML, or other presentation code 202 and the aggregate component JavaScript or other behavioral code 204 to generate the aggregate component region within a web page GUI display within the client application 108 at the client device 106. Based on the configured constituent web component metadata 206, the client application 108 and/or the page generator application 150 retrieves or otherwise obtains the configured web component(s) 124, 210 associated with the aggregate web component object 124, 200, and the client application 108 processes or otherwise executes the presentation code 212 and the behavioral code 214 to automatically generate the configured constituent web component(s) 124, 210 and thereby automatically populate the aggregate component region of the web page GUI display within the client application 108 at the client device 106 with the generated web component(s) 124, 210. Thereafter, based on the aggregate component behavioral code 204 and/or the behavioral code 214 associated with the currently displayed web component(s) 124, 210, the client application 108 and/or the page generator application 150 responds to user actions or other events to dynamically update the web page GUI display at the client application 108 to advance or progress through the web application in accordance with the user configuration of the aggregate web component object 200.

FIGS. 3-14 depict page builder GUI displays that may be generated by the visual page builder 140 within the browser application 108 at the client device 106 in accordance with one or more implementations. FIG. 3 depicts a state of a page builder GUI display 300 in a design mode in response to receiving an indication from a user to create or define a new aggregate web component (or "FlexCard") to be added to a web page. In response to selection of a button or similar GUI element to create a new aggregate web component, the visual page builder 140 provides an aggregate component definition pop-up window 310 that includes text boxes, drop-down menus (or picklists) and/or other GUI elements for configuring or otherwise defining values or attributes for the aggregate web component to be created, such as, for example, providing a name for the aggregate web component, a title for the aggregate web component, a theme for the aggregate web component, a component type for the aggregate web component, and/or the like.

Figure 4:
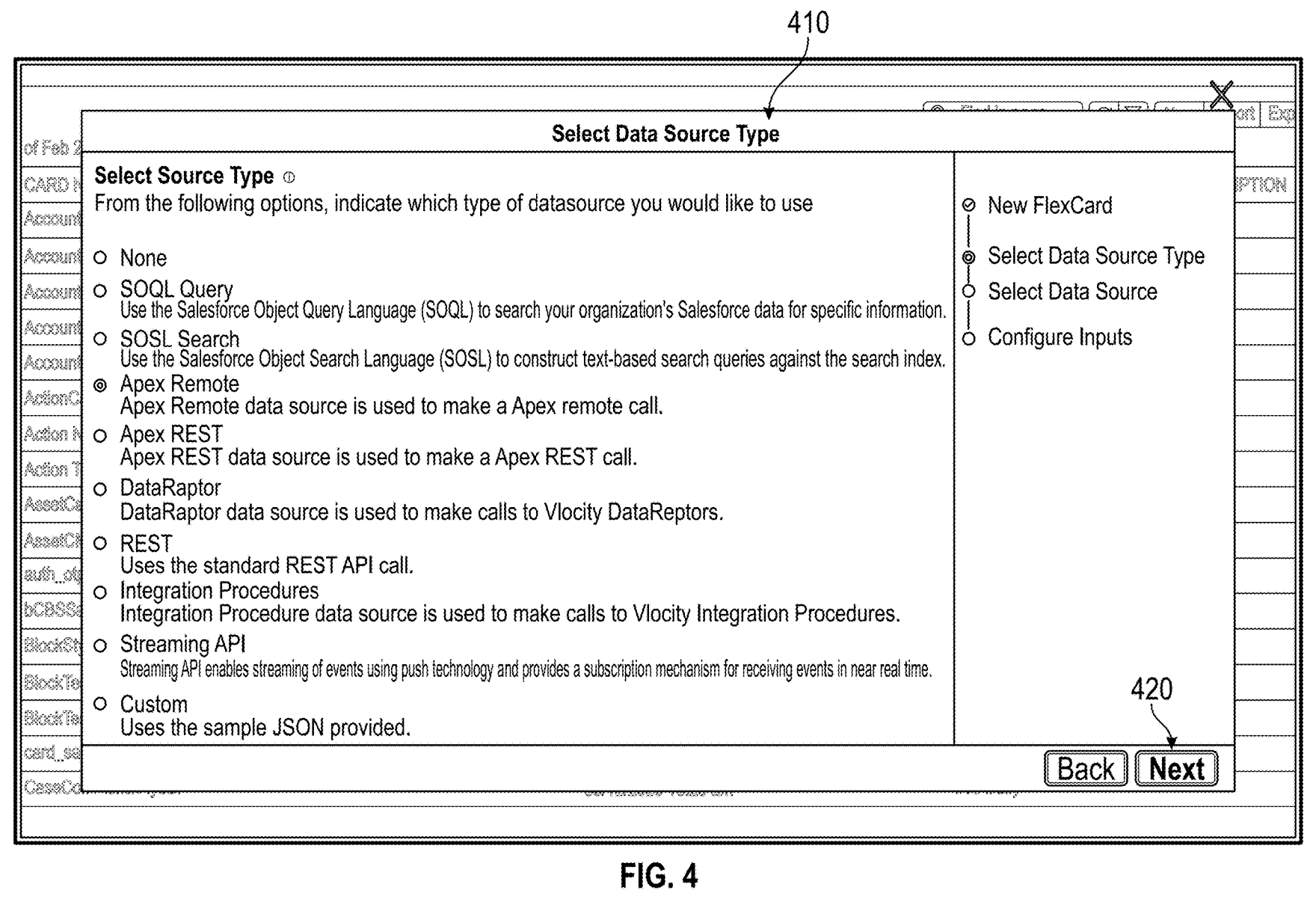

Turning now to FIG. 4, in response to user selection of a button or similar GUI element 320 after defining attributes of the new aggregate web component, the visual page builder 140 updates the page builder GUI display to provide a data source selection pop-up window 410 that includes radio buttons or similar GUI elements manipulable by a user to select or otherwise identify a type of data source that the user would like to utilize to populate the new aggregate web component. In this regard, the visual page builder 140 allows the user to define a particular type of data source on the network 110 to be utilized as a primary data source to populate one or more constituent web components of the aggregate web component. For example, the illustrated implementation shown in FIG. 4 supports receiving data via a selected one of a database object query ("SOQL") at a database system 130, a database object search ("SOSL") at a database system 130, a request or call to an on-demand application platform 136 or server 132 ("Apex Remote"), a Representational State Transfer (REST) call to an on-demand application platform 136 or server 132 ("Apex REST"), a REST API call, an API call to extract, transform, load (ETL) tool ("DataRaptor") for fetching data from a database object, an Integration Procedure (e.g., a series or sequence of API calls that returns data), a Streaming API, or a custom JSON (e.g., a mock data response JSON body when a desired endpoint for data retrieval is not available).

Figure 5:
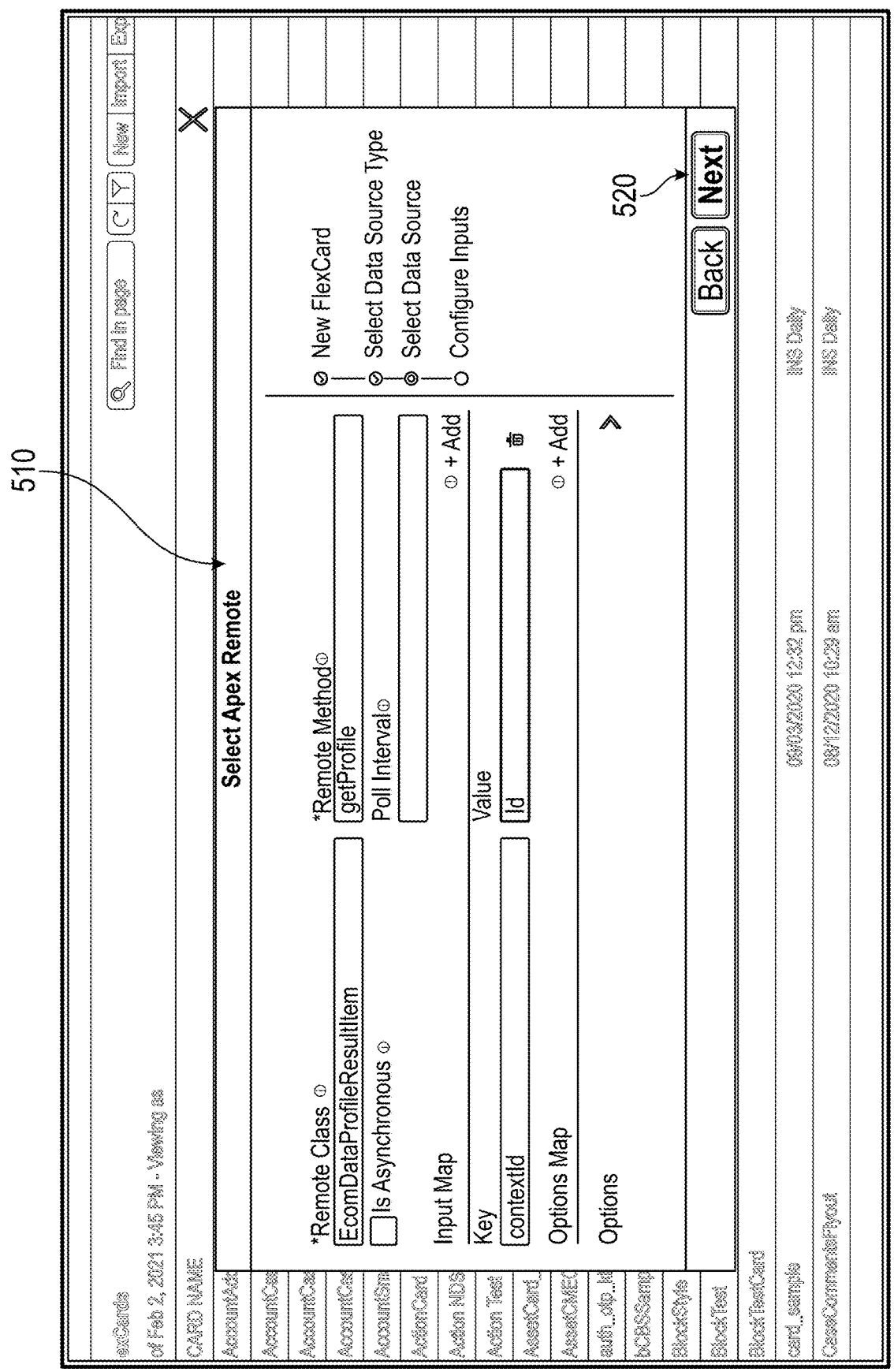

Referring now to FIG. 5, in response to user selection of a button or similar GUI element 420 after defining the data source type to be utilized to populate the new aggregate web component, the visual page builder 140 updates the page builder GUI display to provide a data source configuration pop-up window 510 that includes text boxes, drop-down menus (or picklists) and/or other GUI elements for configuring or otherwise defining values or parameters for retrieving data from the selected type of data source. For example, in response to selection of a call to an on-demand application platform or server ("Apex Remote") as the desired type of data source, the data source configuration pop-up window 510 provides GUI elements for defining the remote class and remote method to be utilized to retrieve the desired data along with key values or other input values to be provided to the identified method of the remote class, which, in turn results in the on-demand application platform or server executing the code for the identified remote method of the identified remote class using the provided key values to obtain data for populating the aggregate web component.

Figure 6:
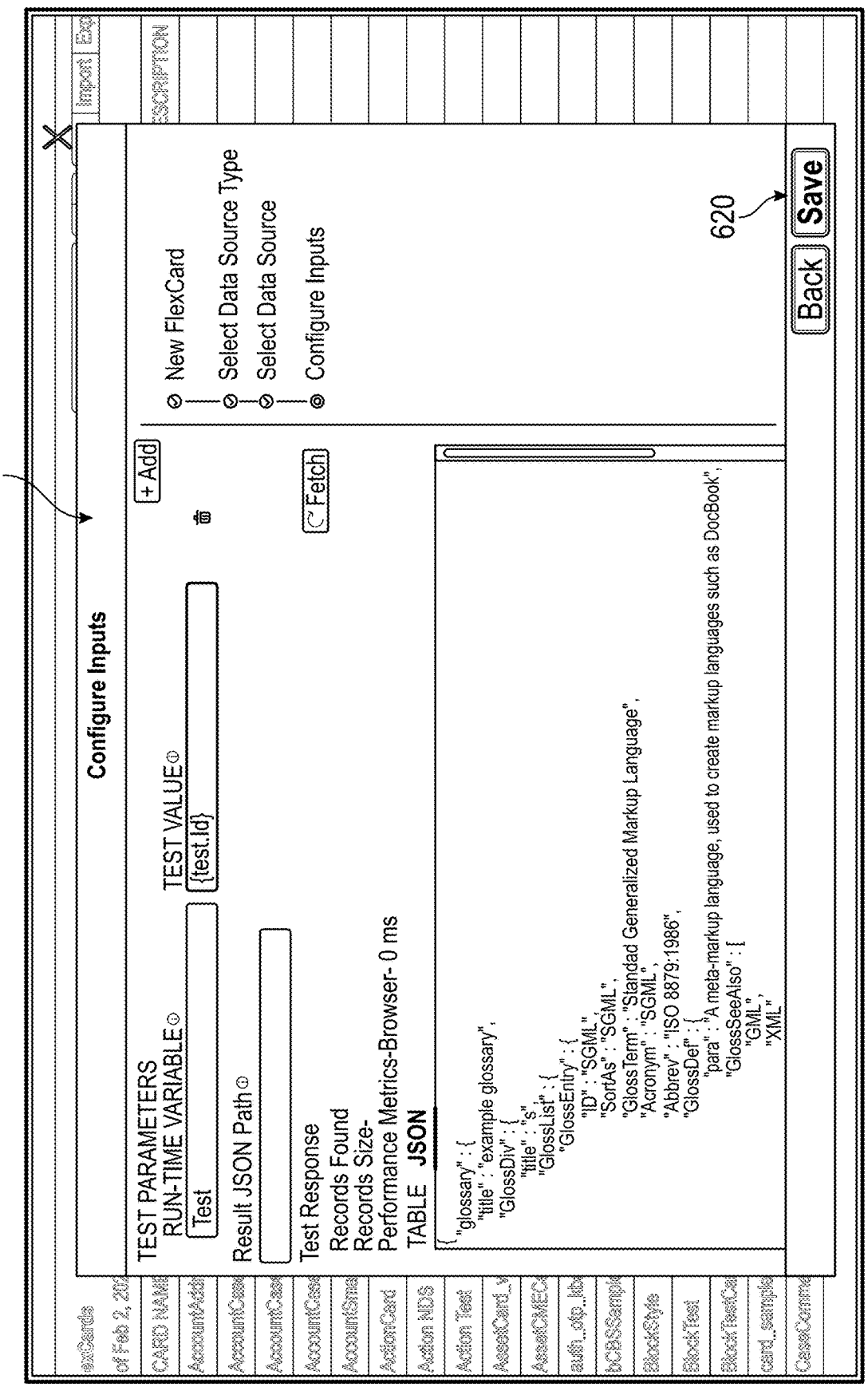

Referring now to FIG. 6, in response to user selection of a button or similar GUI element 520 after configuring the selected type of data source, the visual page builder 140 updates the page builder GUI display to provide an input configuration pop-up window 610 that includes GUI elements that allow the user to set input variables and/or values for the data source and test the user configuration of the selected type of data source to verify or otherwise confirm the current configuration. After verifying the configuration of the aggregate web component and the selected type of data source associated therewith, the user may select a button or similar GUI element 620 to create or otherwise instantiate a configured aggregate web component object 124, 200 in the component database 120 in accordance with the user's configuration of the aggregate web component. In this regard, the visual page builder 140 automatically generates code 202, 204 to be associated with the configured aggregate web component 124, 200 that is configurable to cause a web browser application to retrieve data from the selected type of data source in accordance with the user configuration and maintained in association with metadata 206 corresponding to the user's configuration of the aggregate web component 124, 200.

Figure 7:
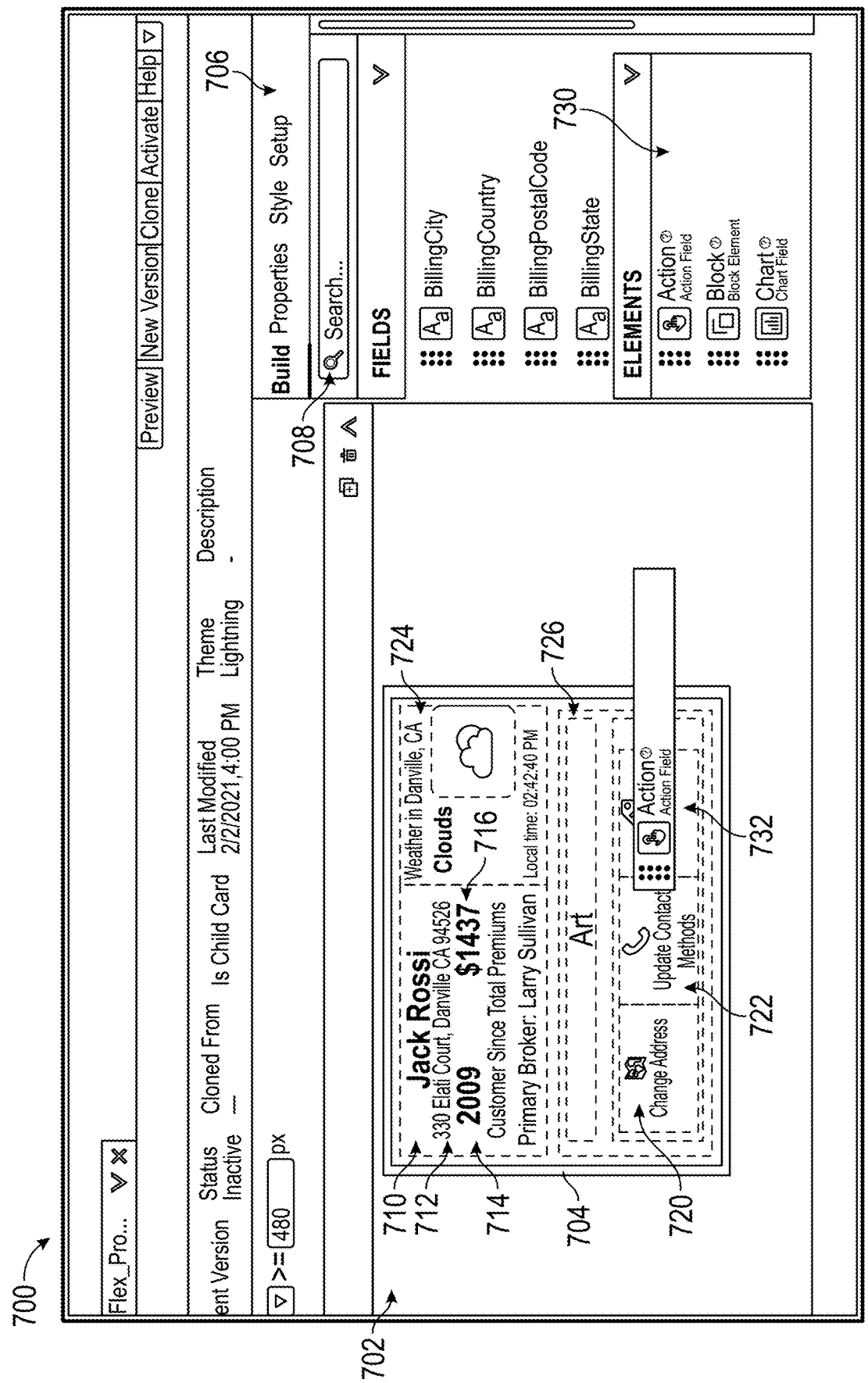

Referring now to FIG. 7, after the user verifies the initial user configuration of the aggregate web component and the selected type of primary data source associated therewith, the visual page builder 140 provides an updated page builder GUI display 700 that includes an editing region 702 that includes a region 704 corresponding to the aggregate web component where the user can drag and drop web components from a component menu sidebar region 706 to add constituent web components to the aggregate web component. In exemplary implementations, the visual page builder 140 is configurable to allow the user to modify the size, shape, dimensions, or other visual characteristics (e.g., border style, background color, etc.) associated with the aggregate component region 704 and update the presentation code 202 associated with the configured aggregate web component 124, 200 accordingly to reflect the user's visual configuration of the aggregate web component region 704.

The component menu sidebar region 706 includes a component lookup text box 708 that a developer user may utilize to search or otherwise query the component database 120 for component templates 122 that match or otherwise corresponding to a user input search string. Additionally, based on the configured primary data source associated with the aggregate web component, the component menu sidebar region 706 includes field web components associated with different fields of data available at the configured primary data source that may be integrated into the aggregate web component. For example, in the illustrated implementation where the configured primary data source associated with the aggregate web component corresponds to a request for a user profile from an application server 132 and/or application platform 136, the visual page builder 140 may identify the available fields of the user profile that may be contained within a response to the request and populate the component menu sidebar region 706 with icons corresponding to the different fields of the user profile (e.g., "BillingCity," "BillingCountry," etc.). In other words, the fields depicted within the component menu sidebar region 706 may vary depending on the configured data source for the aggregate web component, for example, by including greater or fewer fields in response to changes to the number available fields at the configured data source. FIG. 7 depicts a state of the aggregate web component region 704 after the user has dragged and dropped instances of a name field 710, an address field 712, a customer since field 714, and a total premiums field 716 to different locations within the aggregate web component region 704. After dragging and dropping instances of the field elements, the user may modify the visual characteristics of the respective field elements (e.g., the size, shape and/or dimensions of the respective field elements, the font type, font size and font color for presenting the field data, etc.) or other properties for presenting the field elements (e.g., label, conditional display criteria, etc.).

In addition to field elements, the user may add other components to the aggregate component region 704, such as, for example, action web components 720, 722, images or other display web components 724, functional web components, group web components, input web components, and/or script web components. For example, as shown, a developer user may drag and drop an icon corresponding to action component template 730 to within the aggregate component region 704 to create instances of the action components 720, 722, 732 to be integrated or otherwise incorporated into the aggregate web component. In this regard, each action component 720, 722, 732 may be realized as a customizable web component that corresponds to server side action and/or client side action that is rendered as a button or other selectable GUI element that performs the configured action when selected, such as, for example, invoking a process flow or script, navigating to a URL, setting a value in a data JSON associated with a web page GUI display, triggering a publish/subscribe event, refreshing the data source, making an API call from a web browser and/or the like. Additionally, in one or more implementations, the visual page builder 140 may be configurable to allow a user to drag and drop instances of existing or previously-created aggregate web components from the sidebar menu 706 to within the aggregate component region 704 to create an instance of a child aggregate web component 726.

Figure 8:
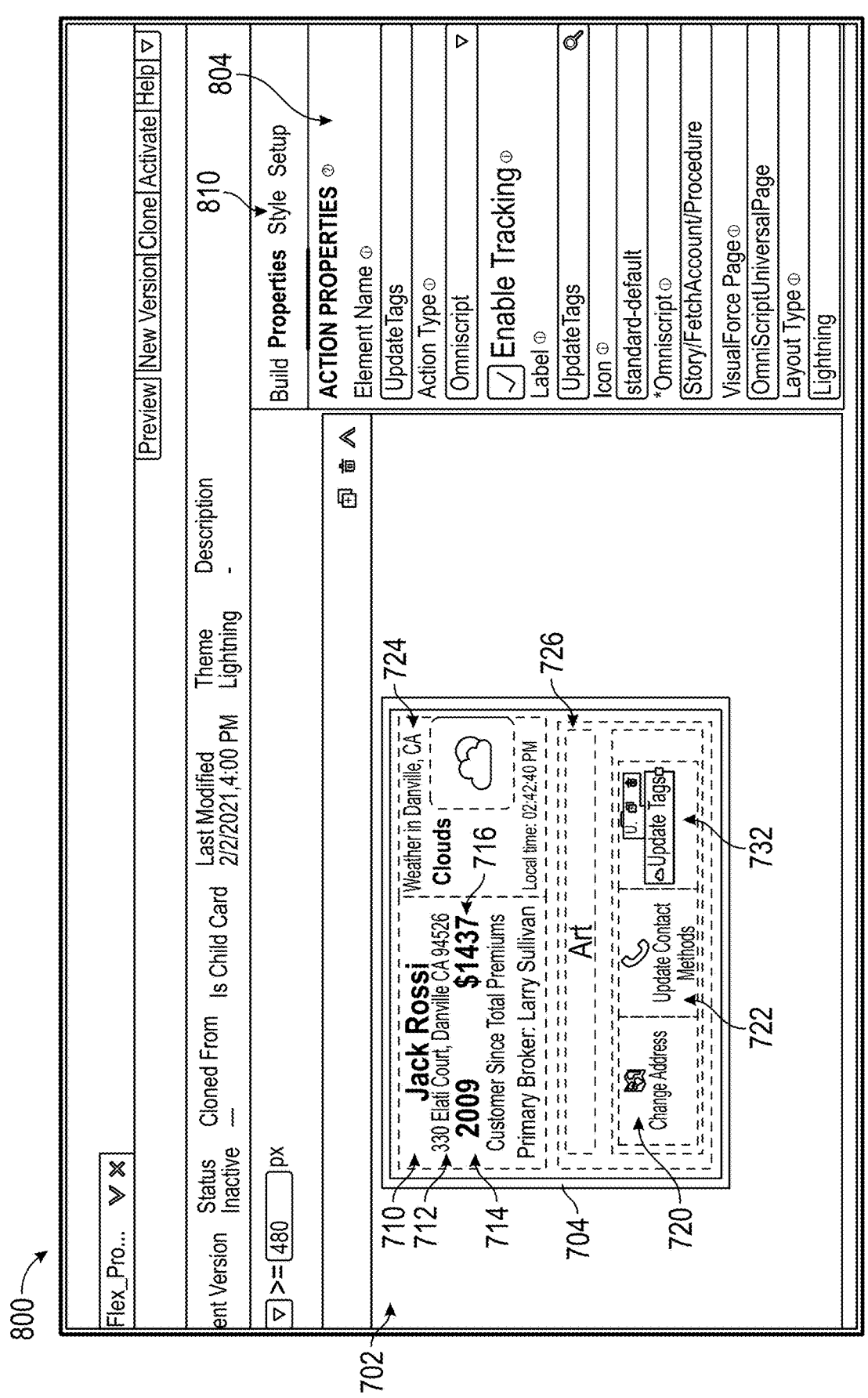

Referring to FIG. 8, after dragging and dropping an instance of the action web component 730 into the aggregate component region 704, an updated page builder GUI display 800 is provided that includes a graphical representation of the action component 732 at the dropped location where it was to be added within the aggregate component region 704 relative to the other web components added to the aggregate component region 704. The updated page builder GUI display 800 also includes an action web component definition sidebar region 804 that includes text boxes and other GUI elements that are configurable to allow the developer user to manually input or otherwise define the values for the attributes, properties, or fields of metadata to be associated with the configured action web component 732, such as, for example, a value for a name field, a value for an action type field, and values for any fields of the selected action type to be defined by an end user. For example, for an instance of the action web component 730, the developer user may identify or configure a process flow web component when the action web component 730 is clicked, activated, or otherwise selected. Examples of process flow web components are described in U.S. patent application Ser. No. 17/248,607 and U.S. patent application Ser. No. 17/249,240, which are each incorporated by reference herein. In this regard, depending on the particular implementation and configuration, a configured action web component 730 may reference or utilize data sources that are different from the primary data source selected and configured for the aggregate web component and the field components 710, 712, 714, 716, that is, the configured action web components 720, 722, 732 may refer to different data sources and/or different locations on the network 110 than the field components 710, 712, 714, 716.

Figure 9:
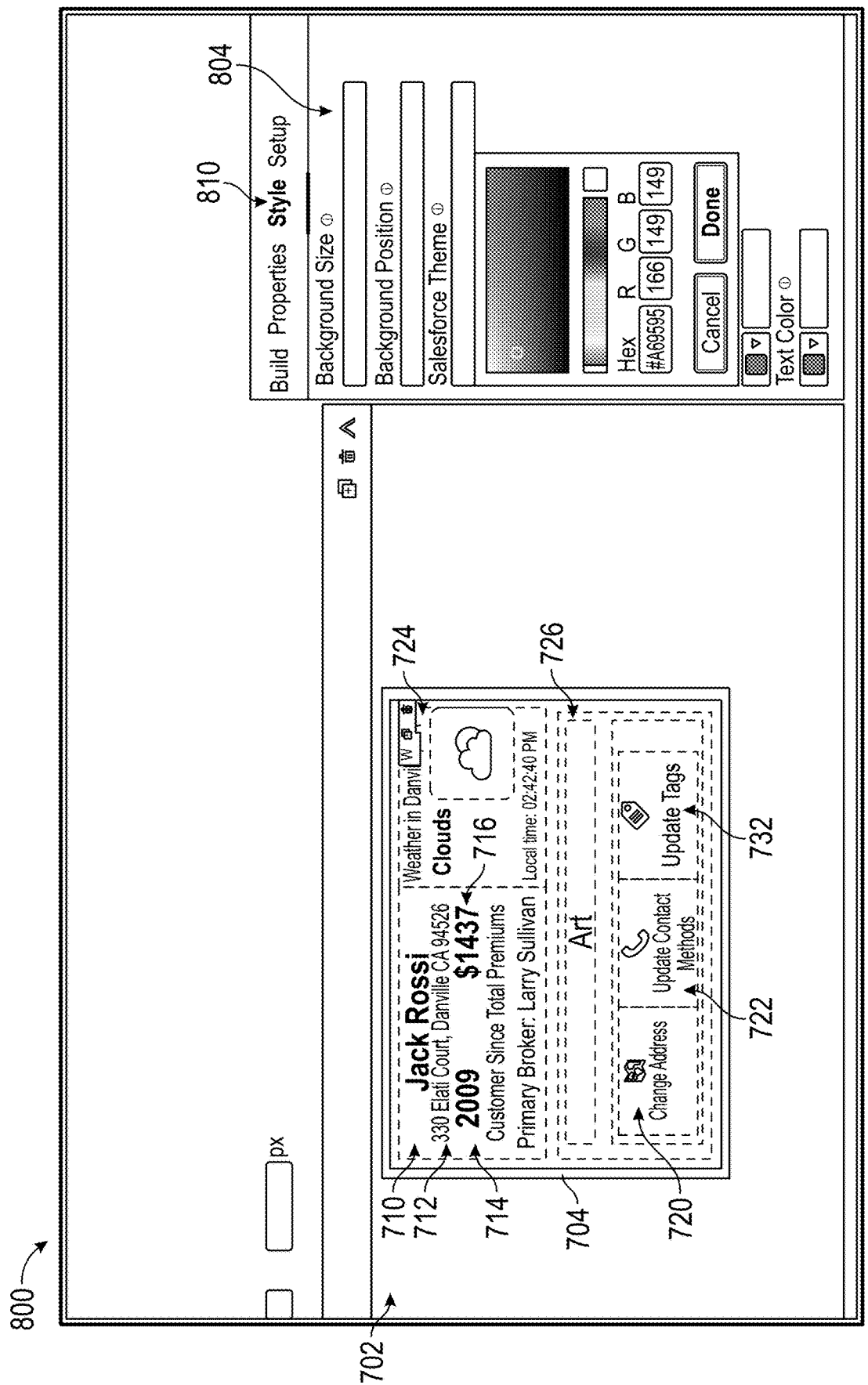

As the user inputs, defines, or otherwise modifies values within the component definition sidebar region 804, the graphical representation of the action component 732 within the aggregate component region 704 is dynamically updated substantially in real-time (e.g., to depict the "Update Tags" label when entered into the action label text box). Additionally, as shown in FIG. 9, in response to selection of a style editing tab 810, the component definition sidebar region 804 is updated to include GUI elements for configuring the visual characteristics associated with the graphical representation of the configured action component 732 (or the data associated therewith), such as, for example, the size, shape and/or dimensions for the action component 732, a background, fill and/or outline color associated with the action component 732, a style, size, and/or color font to be associated with the action component 732, and/or the like. In this regard, some implementations of the visual page designer facilitate declarative styling by allowing a user to add granular styling to constituent web components or the aggregate web component without having to write any custom style sheets or other code to achieve the desired styling.

After the developer user configures the fields or parameters of a component 710, 712, 714, 716, 720, 722, 724, 732 added to the aggregate component region 704, the visual page builder 140 automatically generates a corresponding instance of a configured web component 124, 210 that includes the user-defined values for the fields or parameters of the respective component (e.g., user-defined metadata 216) in association with automatically generated presentation code 212 and the behavioral code 214 based on the respective component using the user-defined values to provide the desired display characteristics and event-driven behavioral characteristics. In this regard, the visual page builder 140 automatically generates the presentation code 212 for the respective component 710, 712, 714, 716, 720, 722, 724, 732 to provide the user's desired visual characteristics for the respective component 710, 712, 714, 716, 720, 722, 724, 732. Additionally, the visual page builder 140 updates or otherwise modifies the code 202, 204 of the configured aggregate web component 124, 200 to automatically generate a respective constituent web component 710, 712, 714, 716, 720, 722, 724, 732 at the desired location or position within the aggregate component region 704 and updates or otherwise modifies the metadata 206 of the configured aggregate web component 124, 200 to refer to the configured web components 124, 210 corresponding to the constituent web components 710, 712, 714, 716, 720, 722, 724, 732 added to the aggregate component region 704.

Figure 10:
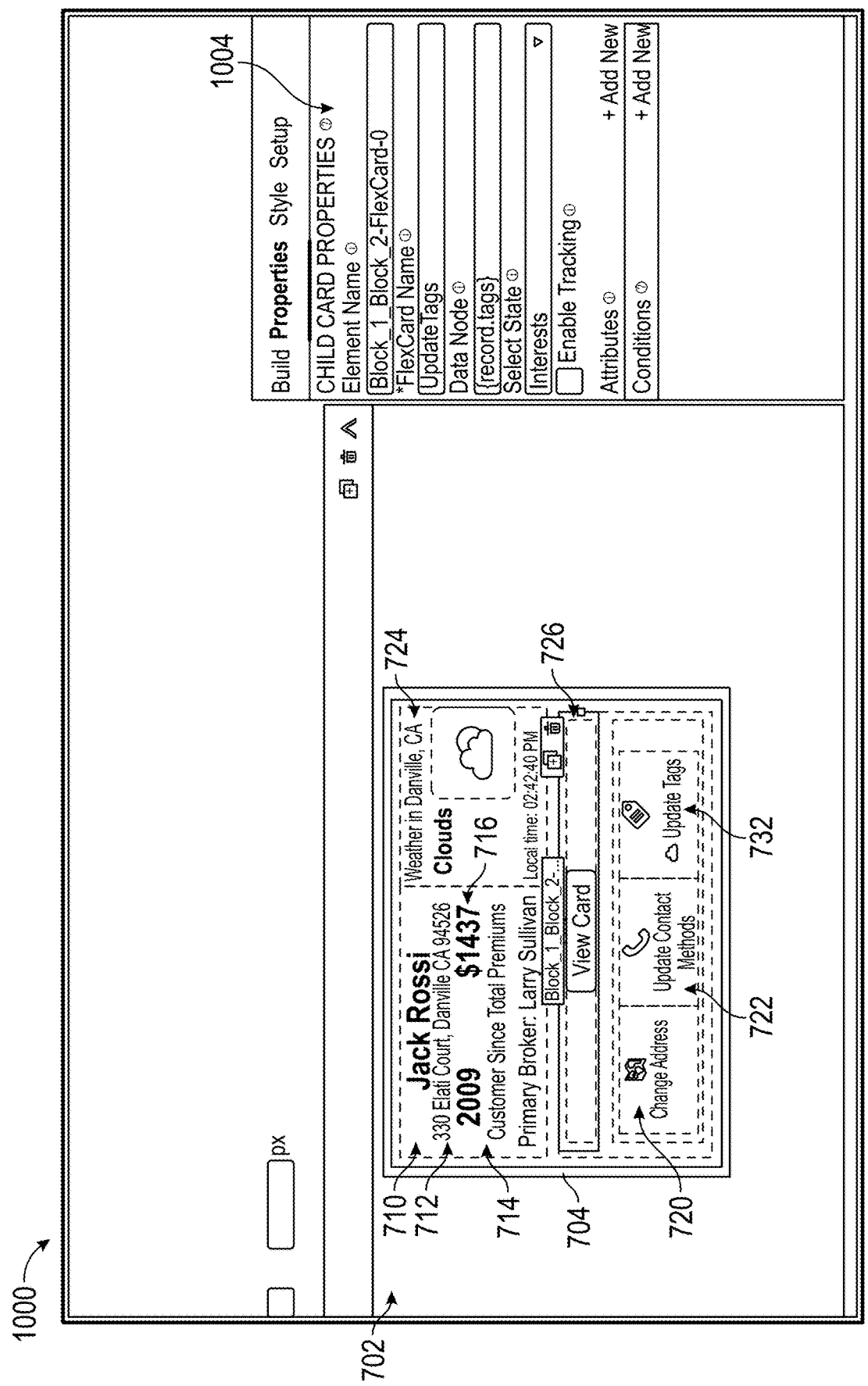

FIG. 10 depicts a state of the page builder GUI display 1000 when a child aggregate web component 726 added to the aggregate component region 704 is selected for editing. The child aggregate web component definition sidebar region 1004 includes text boxes and other GUI elements that are configurable to allow the developer user to manually input or otherwise define the values for the attributes, properties, or fields of metadata to be associated with the configured child aggregate web component 726 that define the relationship between the child web component 726 and the aggregate web component. For example, in various implementations, the child aggregate web component 726 may be configurable to retrieve, obtain, or otherwise invoke data from a different data source than the aggregate web component and/or the child aggregate web component 726 may be configurable to exchange data with the parent aggregate web component, for example, by retrieving or otherwise obtaining data from another web component added to the aggregate web component region 704, or transmitting or otherwise providing data from the child aggregate web component 726 to one or more web components added to the aggregate web component region 704. In this manner, embedding child aggregate web components within an aggregate web component may facilitate generating dynamic web page displays that incorporate data from different data sources in a user configurable manner. In other words, child aggregate web components, action components, and/or other constituent web components can be used to facilitate aggregate web components that can invoke a variety of different types of actions at run-time and interact with one another to pass data from different data sources across various subcomponents of the aggregate web component.

Figure 11:
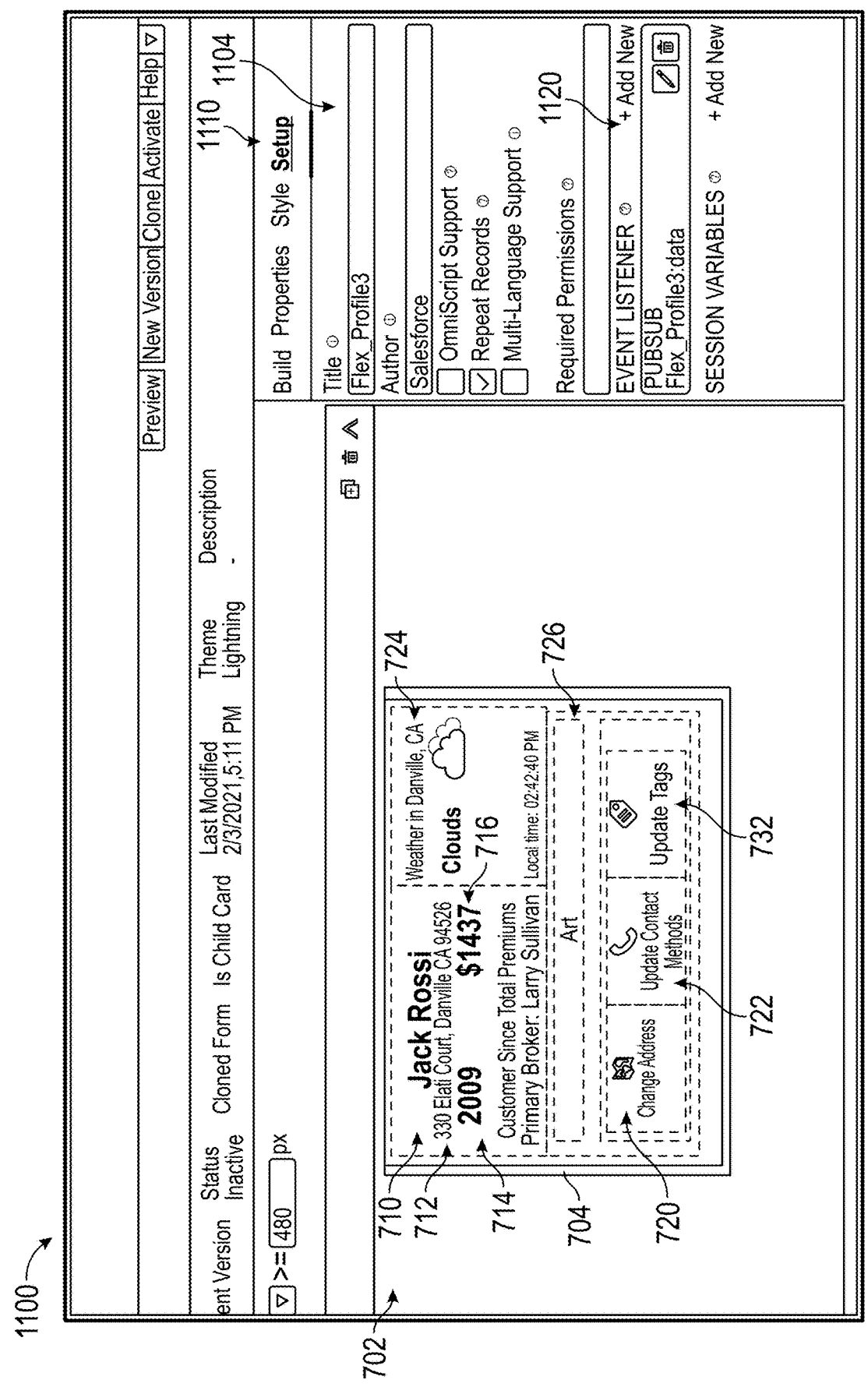
Figure 12:
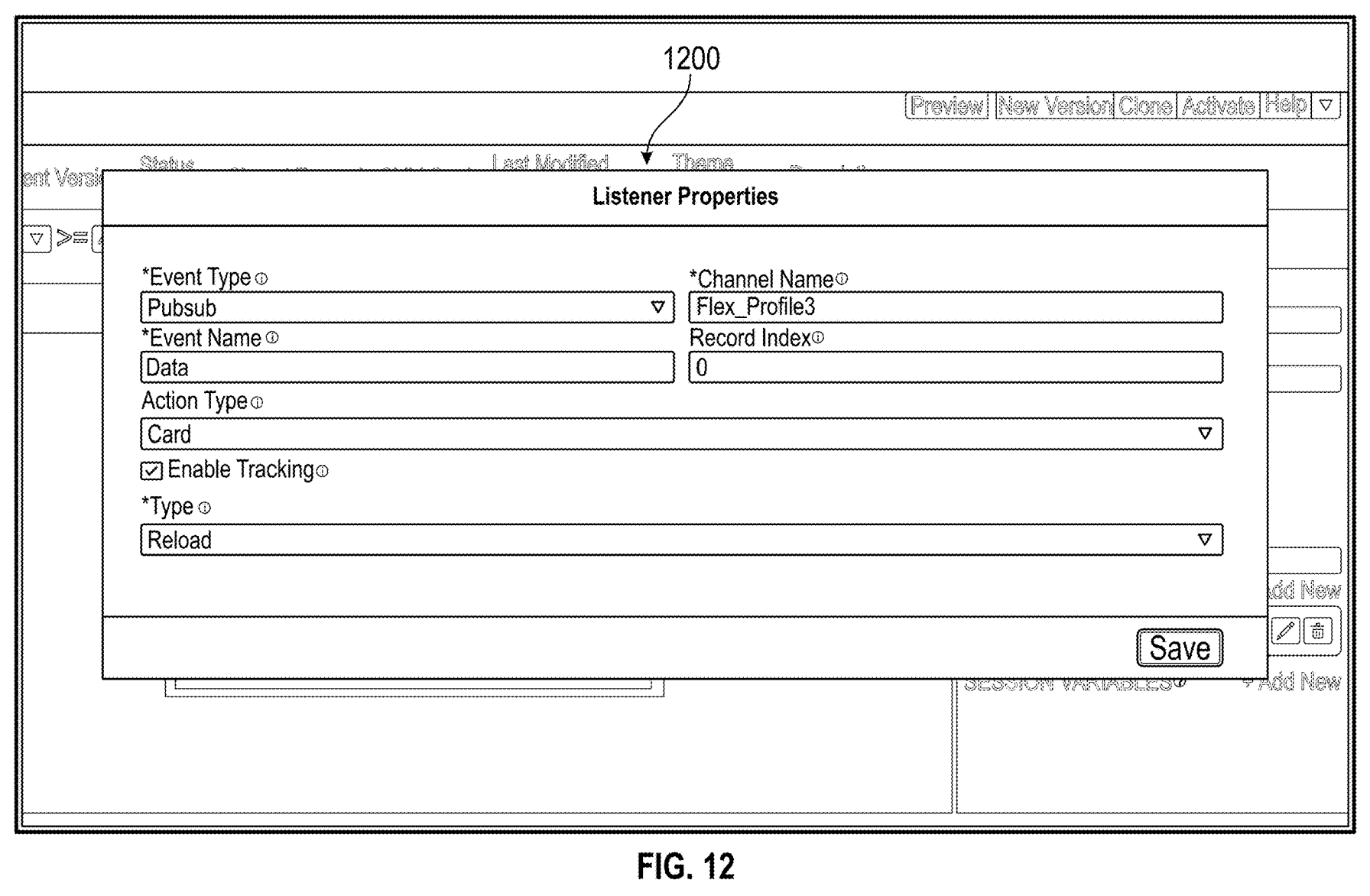

Referring now to FIGS. 11-14, in one or more implementations, the visual page builder 140 is configurable to allow the developer user to configure the aggregate web component to dynamically update in response to events associated with the web browser application utilized to generate and render the aggregate web component at run-time. For example, as shown in FIG. 11, the sidebar region 1104 of the page builder GUI display 1100 includes GUI elements for configuring the aggregate web component corresponding to the aggregate component region 704 when the setup tab 1110 is selected. The setup sidebar region 1104 includes a button or similar GUI element 1120 that is selectable by the user to configure the aggregate web component to listen for events within the web browser and dynamically update or perform other actions in response to the configured event. As shown in FIG. 12, in response to selection of the button 1120 to add an event listener configuration to the aggregate web component, the visual page builder 140 generates an event listener configuration pop-up window 1200 that includes GUI elements for defining values for the fields or attributes that define the event that the aggregate web component is configured to listen or otherwise monitor for within the web browser. For example, as shown, the aggregate web component may be configured to automatically reload in response to a publish/subscribe event associated with a Flex Profile3 channel within the web browser. In this regard, the visual page builder 140 automatically generates updated behavioral code 204 for the configured aggregate web component 124, 200 such that the aggregate web component 124, 200 causes the web browser application 108 to automatically reload in response to occurrence of a publish/subscribe event associated with the Flex Profile3 channel JSON data of the browser document object model (DOM). In this regard, the aggregate web component may be configured to dynamically update in response to a change with respect to another component or region of a web page that is external to the aggregate web component.

Figure 13:
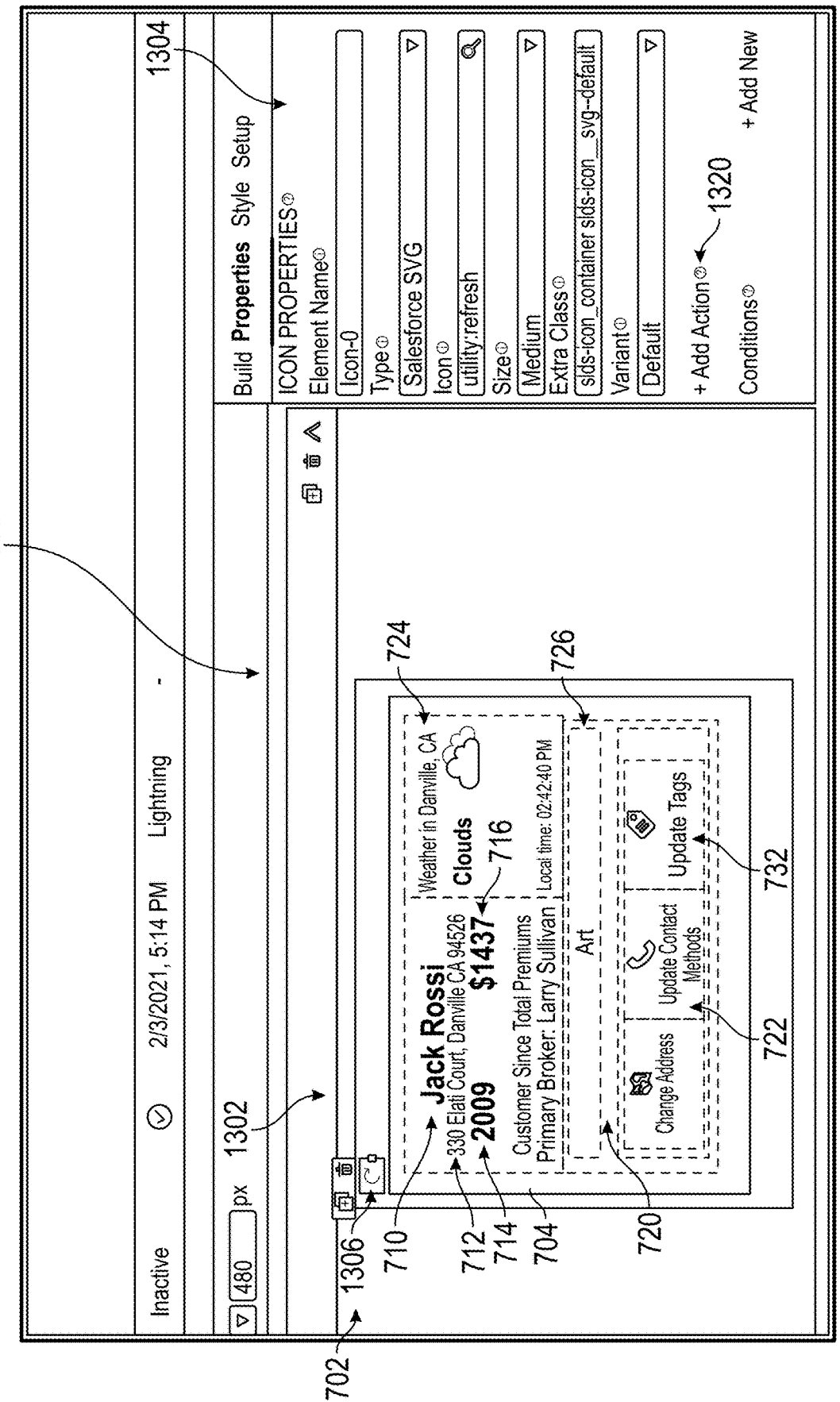

Referring to FIGS. 13-14, after defining an event listener for the aggregate web component, a developer user may drag and drop or otherwise add an icon 1306 to the editing region 1302 of the page builder GUI display 1300 and configure the icon 1306 to trigger the event listener of the aggregate web component. For example, when the icon 1302 is selected, the configuration sidebar region 1304 includes GUI elements for further configuring the icon, including a button or similar GUI element 1320 that is selectable by the user to configure an action to be initiated or otherwise performed in response to the user selection of the icon. As shown in FIG. 14, in response to selection of the button 1320 to add an action to the icon 1302, the visual page builder 140 generates an action configuration pop-up window 1400 that includes GUI elements for defining values for the fields or attributes that define an action to be automatically initiated or performed in response to the event that the aggregate web component is configured to listen for. In this regard, the action may be configured to generate a publish/subscribe event associated with the Flex Profile3 channel, and thereby trigger the event listener associated with the aggregate web component to automatically reload the aggregate web component (and its constituent web components) in response to selection of the icon 1302.

Still referring to FIGS. 3-14, in exemplary implementations, the page builder GUI display includes a mode selection GUI element for transitioning from a design mode to a preview mode. In the preview mode, the GUI display provided by the visual page builder 140 corresponds to the rendering and execution of the configured aggregate web component 124, 200 and the configured constituent web components 124, 210 associated therewith. In this regard, the preview mode includes graphical representations of the constituent web components 124, 210 having visual and spatial characteristics corresponding the user's respective configuration of each respective web component 124, 210. The preview mode may also provide graphical representations that facilitate a developer user analyzing and debugging the configuration of the aggregate web component concurrently while previewing the currently configured presentation of aggregate web component that would be provided to an end user.

Figure 15:
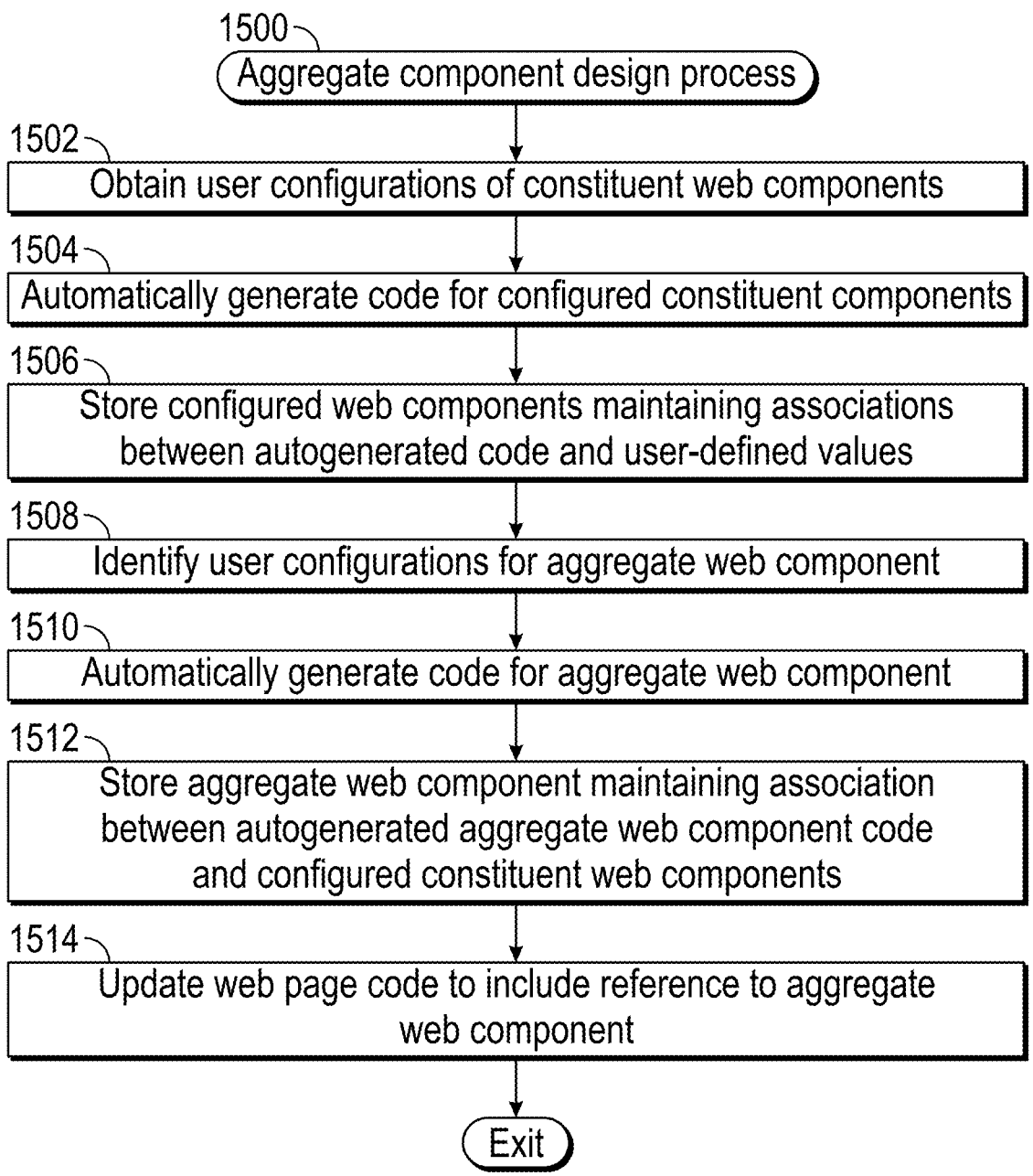
FIG. 15 is a flow diagram illustrating an aggregate component design process suitable for use in connection with a web page design service in the computing system according to some example implementations.

FIG. 15 depicts an exemplary aggregate component design process 1500 that may be implemented or otherwise performed by a computing system to allow users to design, define or otherwise configure an aggregate web component for incorporation into a web page associated with a web application in a visual, WYSIWYG, drag and drop manner and perform additional tasks, functions, and/or operations described herein. For illustrative purposes, the following description may refer to elements mentioned above in connection with FIG. 1. In this regard, while portions of the aggregate component design process 1500 may be performed by different elements of the computing system 100, for purposes of explanation, the subject matter is described herein in the context of the aggregate component design process 1500 being primarily performed by the application server 102, the application platform 104 and/or the visual page builder 140. It should be appreciated that the aggregate component design process 1500 may include any number of additional or alternative tasks, the tasks need not be performed in the illustrated order and/or the tasks may be performed concurrently, and/or the aggregate component design process 1500 may be incorporated into a more comprehensive procedure or process having additional functionality not described in detail herein. Moreover, one or more of the tasks shown and described in the context of FIG. 15 could be omitted from a practical implementation of the aggregate component design process 1500 as long as the intended overall functionality remains intact.

Referring to FIG. 15, the aggregate component design process 1500 identifies or otherwise obtains constituent web components added to an aggregate component region of a page builder GUI display, and for each constituent web component, identifies or otherwise obtains values for various fields of the respective web component that are input, selected or otherwise defined by the user to configure the respective web component (task 1502). For example, as described above in the context of FIGS. 3-14, the application server 102 and/or the application platform 104 may provide a page builder GUI display associated with a web page design service within a browser application 108 at a client device 106 that includes a menu of configurable web components that may be integrated into an aggregate web component by dragging and dropping selected ones of the configurable web components to an aggregate web component region of the page builder GUI display. After a user drags and drops an instance of a selected type of configurable web component to the aggregate web component region, the page builder GUI display is configurable to allow the user to input, select, or otherwise define different values for different parameters, attributes, properties or fields to be associated with the selected type of configurable web component. Likewise, the page builder GUI display allows the user to drag and drop instances of configurable web components to the aggregate web component region to different locations relative to other web components (e.g., above or below a previously added web component, to the left or right of a previously added web component, etc.) to define a spatial arrangement of the instances of web components added to the aggregate web component region.

For each instance of a configurable web component added to the aggregate web component region, the aggregate component design process 1500 automatically generates code for instantiating or otherwise implementing the respective web component at run-time and stores or otherwise maintains the autogenerated code associated with the respective web component in association with the user-defined values that define the user's desired configuration of that respective web component (tasks 1504, 1506). For example, based on the component type, rules, structure, and/or other attributes assigned to the particular configurable component template 122 associated with the respective instance of configurable web component, the web page design service supported by the application server 102 and/or the application platform 104 automatically generates presentation code 212 (e.g., HTML code or the like) for rendering the respective web component and automatically generates behavioral code 214 (e.g., JavaScript or the like) for providing the desired event-driven behavior of the respective web component using one or more of the user-defined values for the configuration of the respective web component. In this regard, the behavioral code 214 may be configurable to retrieve or otherwise obtain data for populating or rendering the web component from a user-defined data source on the network 110 based on a network address or other information identifying the data source contained in the user-defined metadata 216 for the respective web component. The web page design service stores or otherwise maintains a configured web component object 124, 210 in a component database 120 that maintains an association between the autogenerated code 212, 214 for that respective instance of configured web component added to the aggregate web component region and the user-defined metadata values 216 that were input, defined, or otherwise configured for that respective instance of configured web component using the page builder GUI display.

In a similar manner, the aggregate component design process 1500 identifies or otherwise obtains values for various fields that were input, selected or otherwise defined by the user to configure the aggregate web component, automatically generates code for instantiating or otherwise implementing the aggregate web component at run-time and stores or otherwise maintains the autogenerated code associated with the aggregate web component in association with the metadata that identify the constituent web components defined for the aggregate web component within the aggregate web component region (tasks 1508, 1510, 1512). In this regard, the web page design service supported by the application server 102 and/or the application platform 104 automatically generates presentation code 202 (e.g., HTML code or the like) for rendering the aggregate web component by invoking and rendering the constituent web components identified by the aggregate web component metadata 206 at the desired locations relative to one another within the aggregate web component and automatically generates behavioral code 204 (e.g., JavaScript or the like) for providing the desired event-driven behavior of the aggregate web component. The behavioral code 204 is automatically generated and configured to support the particular type of data source selected and configured for the aggregate web component and provide the desired event listener behavior for the aggregate web component, while the presentation code 202 renders the aggregate web component in accordance with the visual characteristics defined for the aggregate web component. The web page design service then stores or otherwise maintains an aggregate web component object 124, 200 in the component database 120 that maintains an association between the autogenerated aggregate component code 202, 204 and the metadata values 206 that identify the constituent configured web component objects 124, 210 defined for the aggregate web component. For a deployment to an on-demand multi-tenant database system 130 or integration with an on-demand virtual application platform 104, 136, a specific metadata file associated with the aggregate web component 200 may also be generated that identifies the particular parts of the application platform 104, 136 where the generated aggregate web component 200 can be utilized.

In one or more implementations, the aggregate component design process 1500 automatically updates the web page code associated with a web application to incorporate or otherwise include reference to the aggregate web component object (task 1514). For example, when a developer user selects or otherwise manipulates an activate button or similar GUI element within the page builder GUI display to deploy or otherwise implement the aggregate web component defined within the aggregate web component region within a web application, the web page design service may automatically update the HTML code of an HTML file associated with a web application that resides at a URL or other network address associated with the web application to include a reference to the aggregate web component object 124, 200 in the component database 120. In this regard, when a user of a client device 106 subsequently utilizes a web browser or similar browser application 108 to access or retrieve the URL associated with the web application, the browser application 108 retrieves or otherwise obtains the HTML file for the web page associated with the web application at that address from the network 110 and then parses or otherwise executes the HTML code to generate the web page GUI display associated with the web application within the browser application 108. When the browser application 108 encounters the reference to the aggregate web component object 124, 200 in the component database 120, the browser application 108 transmits or otherwise provides a request to the application platform 104 and/or the page generator 150 over the network 110 to retrieve the aggregate web component object 124, 200 in the component database 120. After retrieving the aggregate web component object 124, 200, the browser application 108 and/or the page generator 150 parse or otherwise execute the presentation code 202, the behavioral code 204, and the component sequence metadata 206 to generate the aggregate web component within the web page GUI display(s) for the web application in accordance with the developer user's configuration of the aggregate web component and constituent web components.

As described above in the context of FIGS. 1-14, after a developer user adds an aggregate web component to a web page, configures the aggregate web component, and adds and configures constituent web components associated with the aggregate web component, the visual process designer 140 is configurable to automatically generate the presentation code and behavioral code for implementing the configured aggregate web component and the constituent web components, with the presentation code and metadata associated with the configured aggregate web component being configurable to reference and render the configured constituent web components at the user's desired relative locations within the aggregate web component region of the web page (e.g., at their respective dragged-and-dropped locations within the aggregate web component region) and with the user's desired styling of the respective components. In this regard, the code that is automatically generated by the visual page designer 140 is configurable to cause a web browser application 108 to invoke the configured aggregate web component and render the constituent web components with a desired, user-defined spatial arrangement within the aggregate web component region of the web page GUI display while providing the desired event-driven behaviors for the aggregate web component and constituent web components. The visual process designer 140 stores or otherwise maintains the configured web components 124, 200, 210 in the component database 120 and updates the HTML, code of the web page file to refer to the configured aggregate web component 124, 200 in the component database 120 at the desired relative location within the web page GUI display (e.g., at the dragged-and-dropped location of the aggregate web component within the web page).

In one or more implementations, the configured web components 124, 200, 210 for implementing an aggregate web component defined using the visual page builder 140 may be deployed to the database system 130 or other locations on a network 110 for implementation or incorporation within a web page of a web application supported by another computing system or platform independent of the application server 102 and/or the component database 120, such as, for example, by the application platform 136 provided by the application server 132 of the database system 130. For example, the configured web components 124, 200, 210 may be instantiated or otherwise created as database objects 138 in the database 134 to be incorporated in a web page of a virtual application supported by the application platform 136. Depending on the data source configuration for the aggregate web component, the aggregate web component may be utilized to incorporate other data from the database 134 or other locations on the network 110 into the virtual application, with the aggregate web component and constituent web components being dynamically generated at run-time to reflect the current or most up-to-date data residing at the selected data source.

Figure 16A:
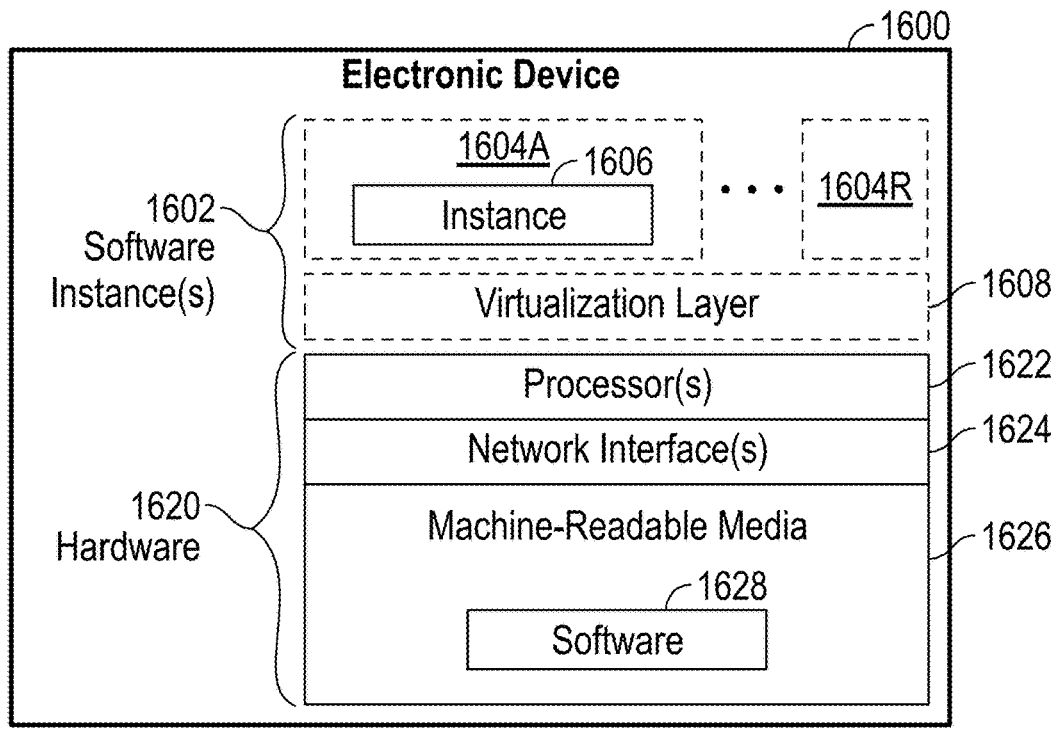
FIG. 16A is a block diagram illustrating an electronic device according to some example implementations.
Figure 16B:
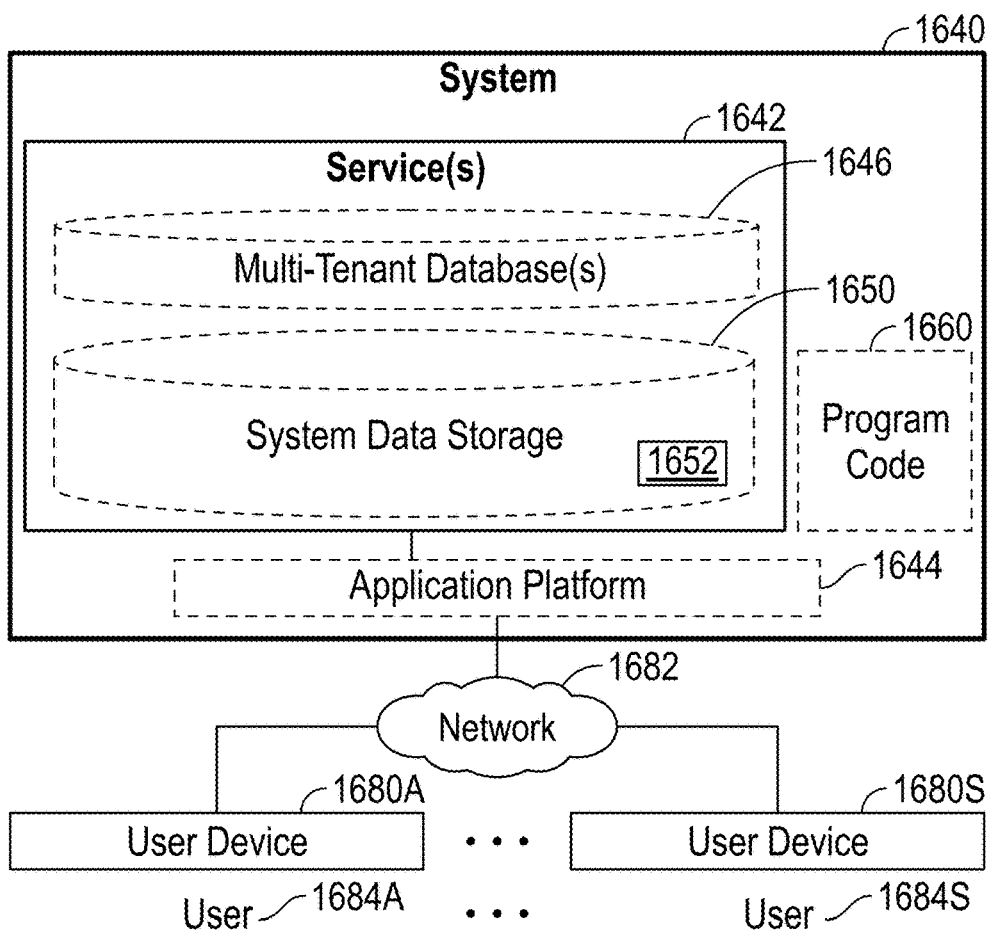
FIG. 16B is a block diagram of a deployment environment according to some example implementations.

Referring now to FIGS. 16A-16B, one or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

FIG. 16A is a block diagram illustrating an electronic device 1600 according to some example implementations. FIG. 16A includes hardware 1620 comprising a set of one or more processor(s) 1622, a set of one or more network interfaces 1624 (wireless and/or wired), and machine-readable media 1626 having stored therein software 1628 (which includes instructions executable by the set of one or more processor(s) 1622). The machine-readable media 1626 may include non-transitory and/or transitory machine-readable media. Each of the previously described clients and the web page design service may be implemented in one or more electronic devices 1600. In one implementation: 1) each of the clients is implemented in a separate one of the electronic devices 1600 (e.g., in end user devices where the software 1628 represents the software to implement clients to interface directly and/or indirectly with the web page design service (e.g., software 1628 represents a web browser, a native client, a portal, a command-line interface, and/or an application programming interface (API) based upon protocols such as Simple Object Access Protocol (SOAP), Representational State Transfer (REST), etc.)); 2) the web page design service is implemented in a separate set of one or more of the electronic devices 1600 (e.g., a set of one or more server devices where the software 1628 represents the software to implement the web page design service); and 3) in operation, the electronic devices implementing the clients and the web page design service would be communicatively coupled (e.g., by a network) and would establish between them (or through one or more other layers and/or or other services) connections for submitting authorization requests to the web page design service and returning access tokens to the clients. Other configurations of electronic devices may be used in other implementations (e.g., an implementation in which the client and the web page design service are implemented on a single one of electronic device 1600).

During operation, an instance of the software 1628 (illustrated as instance 1606 and referred to as a software instance; and in the more specific case of an application, as an application instance) is executed. In electronic devices that use compute virtualization, the set of one or more processor(s) 1622 typically execute software to instantiate a virtualization layer 1608 and one or more software container(s) 1604A-704R (e.g., with operating system-level virtualization, the virtualization layer 1608 may represent a container engine (such as Docker Engine by Docker, Inc. or rkt in Container Linux by Red Hat, Inc.) running on top of (or integrated into) an operating system, and it allows for the creation of multiple software containers 1604A-704R (representing separate user space instances and also called virtualization engines, virtual private servers, or jails) that may each be used to execute a set of one or more applications; with full virtualization, the virtualization layer 1608 represents a hypervisor (sometimes referred to as a virtual machine monitor (VMM)) or a hypervisor executing on top of a host operating system, and the software containers 1604A-704R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1628 is executed within the software container 1604A on the virtualization layer 1608. In electronic devices where compute virtualization is not used, the instance 1606 on top of a host operating system is executed on the "bare metal" electronic device 1600. The instantiation of the instance 1606, as well as the virtualization layer 1608 and software containers 1604A-704R if implemented, are collectively referred to as software instance(s) 1602.

Alternative implementations of an electronic device may have numerous variations from that described above. For example, customized hardware and/or accelerators might also be used in an electronic device.

FIG. 16B is a block diagram of a deployment environment according to some example implementations. A system 1640 includes hardware (e.g., a set of one or more server devices) and software to provide service(s) 1642, including the web page design service. In some implementations the system 1640 is in one or more datacenter(s). These datacenter(s) may be: 1) first party datacenter(s), which are datacenter(s) owned and/or operated by the same entity that provides and/or operates some or all of the software that provides the service(s) 1642; and/or 2) third-party datacenter(s), which are datacenter(s) owned and/or operated by one or more different entities than the entity that provides the service(s) 1642 (e.g., the different entities may host some or all of the software provided and/or operated by the entity that provides the service(s) 1642). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 1640 is coupled to user devices 1680A-1680S over a network 1682. The service(s) 1642 may be on-demand services that are made available to one or more of the users 1684A-1684S working for one or more entities other than the entity which owns and/or operates the on-demand services (those users sometimes referred to as outside users) so that those entities need not be concerned with building and/or maintaining a system, but instead may make use of the service(s) 1642 when needed (e.g., when needed by the users 1684A-1684S). The service(s) 1642 may communicate with each other and/or with one or more of the user devices 1680A-1680S via one or more APIs (e.g., a REST API). In some implementations, the user devices 1680A-1680S are operated by users 1684A-1684S, and each may be operated as a client device and/or a server device. In some implementations, one or more of the user devices 1680A-1680S are separate ones of the electronic device 1600 or include one or more features of the electronic device 1600.

In some implementations, the system 1640 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 1640 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 1640 may include an application platform 1644 that enables PAAS for creating, managing, and executing one or more applications developed by the provider of the application platform 1644, users accessing the system 1640 via one or more of user devices 1680A-1680S, or third-party application developers accessing the system 1640 via one or more of user devices 1680A-1680S.

In some implementations, one or more of the service(s) 1642 may use one or more multi-tenant databases 1646, as well as system data storage 1650 for system data 1652 accessible to system 1640. In certain implementations, the system 1640 includes a set of one or more servers that are running on server electronic devices and that are configured to handle requests for any authorized user associated with any tenant (there is no server affinity for a user and/or tenant to a specific server). The user devices 1680A-1680S communicate with the server(s) of system 1640 to request and update tenant-level data and system-level data hosted by system 1640, and in response the system 1640 (e.g., one or more servers in system 1640) automatically may generate one or more Structured Query Language (SQL) statements (e.g., one or more SQL queries) that are designed to access the desired information from the multi-tenant database(s) 1646 and/or system data storage 1650.

In some implementations, the service(s) 1642 are implemented using virtual applications dynamically created at run time responsive to queries from the user devices 1680A-1680S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1644 includes an application setup mechanism that supports application developers' creation and management of applications, which may be saved as metadata by save routines. Invocations to such applications, including the web page design service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $6^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 1640 and the user devices 1680A-1680S.

Each user device 1680A-1680S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1640. For example, the user interface device can be used to access data and applications hosted by system 1640, and to perform searches on stored data, and otherwise allow one or more of users 1684A-1684S to interact with various GUI pages that may be presented to the one or more of users 1684A-1684S. User devices 1680A-1680S might communicate with system 1640 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 1680A-1680S might include an HTTP client, commonly referred to as a "browser," for sending and receiving HTTP messages to and from server(s) of system 1640, thus allowing users 1684A-1684S of the user devices 1680A-1680S to access, process and view information, pages and applications available to it from system 1640 over network 1682.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A method comprising:
providing a page builder graphical user interface (GUI) display at a client device over a network, wherein the page builder GUI display comprises configurable components for integration in a web page;
obtaining, via a GUI element of the page builder GUI display, an indication of a primary data source on the network selected by a user for an aggregate component on the page builder GUI display;
generating first behavioral code corresponding to the aggregate component to retrieve data from the primary data source in accordance with a user configuration;
obtaining, via the page builder GUI display, a configured set of the configurable components added to the aggregate component on the page builder GUI display, wherein the configured set of the configurable components includes a web component associated with one or more fields of the data available from the primary data source;
generating behavioral code corresponding to the configured set of the configurable components based at least in part on a respective data source associated with the respective configurable component of the configured set, wherein the behavioral code comprises second behavioral code for the web component to obtain the one or more fields of the data available from the primary data source selected for the aggregate component;
generating presentation code corresponding to a spatial arrangement of the configured set of the configurable components added to the aggregate component;
creating an aggregate component object in a database to maintain an association between the first behavioral code, the presentation code and the behavioral code for the configured set of the configurable components; and
updating code for the web page to include a reference to the aggregate component object.

2. The method of claim 1, further comprising creating, for each configurable component of the configured set of configurable components, a respective configured component object in the database, wherein the aggregate component object includes metadata identifying the respective configured component objects in the database for the configured set of configurable components.

3. The method of claim 2, wherein generating the presentation code comprises generating Hypertext Markup Language (HTML) code for displaying the spatial arrangement of the configured set of configurable components within a region of the web page corresponding to the aggregate component, wherein the HTML code is configurable to utilize the metadata to invoke the respective configured component objects in the database for the configured set of configurable components.

4. The method of claim 3, wherein the HTML code is configurable to render each respective configured component object at a respective drag-and-drop location associated with the respective configurable component of the configured set of configurable components within the region of the web page corresponding to the aggregate component.

5. The method of claim 1, wherein:
generating the behavioral code corresponding to the configured set of the configurable components comprises:
generating respective behavioral code for one or more configurable components of the configured set of configurable components based at least in part on the primary data source selected for the aggregate component; and
creating, for each configurable component of the one or more configurable components of the configured set of configurable components, a respective configured component object in the database that maintains the respective behavioral code; and
the aggregate component object includes metadata identifying the one or more respective configured component objects in the database for the one or more configurable components of the configured set of configurable components.

6. The method of claim 5, wherein generating the presentation code comprises generating Hypertext Markup Language (HTML) code for displaying the spatial arrangement of the configured set of configurable components within a region of the web page corresponding to the aggregate component, wherein the HTML code is configurable to invoke the respective configured component objects in the database for the configured set of configurable components and render a first configured component object at a respective drag-and-drop location associated with a first configurable component.

7. The method of claim 1, wherein generating the behavioral code comprises generating the behavioral code to dynamically update at least one of the configured set of the configurable components in response to an event associated with a web browser presenting the web page.

8. The method of claim 1, wherein:
the primary data source comprises an on-demand application platform;
the user configuration comprises at least one of a remote class and a remote method to be utilized to retrieve the data; and
the first behavioral code comprises JavaScript or client-side executable code that results in the on-demand application platform executing code for the at least one of the remote class and the remote method to obtain the data.

9. The method of claim 1, wherein the primary data source comprises one of a database system, an on-demand application platform, an application programming interface (API) call and an extract, transform, load (ETL) tool.

10. A non-transitory machine-readable storage medium that provides instructions that, when executed by a processor, are configurable to cause said processor to perform operations comprising:
providing a page builder graphical user interface (GUI) display at a client device over a network, wherein the page builder GUI display comprises a menu of configurable components for integration in a web page;
obtaining, via a GUI element of the page builder GUI display, an indication of a primary data source on the network selected by a user for an aggregate component on the page builder GUI display;
obtaining, from the page builder GUI display, a plurality of configured components from the menu of configurable components added to a region on the page builder GUI display corresponding to the aggregate component, wherein the plurality of configured components includes a web component associated with one or more fields of data available from the primary data source;
generating configured code for each configured component of the plurality of configured components in accordance with a respective configuration of the respective configured component of the plurality of configured components, wherein the configured code comprises second behavioral code for the web component to obtain the one or more fields of the data available from the primary data source selected for the aggregate component;
identifying a spatial arrangement of the plurality of configured components within the region;
generating aggregate component code configurable to cause a browser application to retrieve the data from the primary data source in accordance with a user configuration and generate each configured component of the plurality of configured components within the region in accordance with the spatial arrangement; and
updating code for the web page to include a reference to the aggregate component code.

11. The non-transitory machine-readable storage medium of claim 10, wherein the instructions are configurable to cause said processor to:
create, for each configured component of the plurality of configured components, a respective configured component object in a database maintaining an association between the respective configured component and the respective configured code for the respective configured component; and
create an aggregate component object in the database, wherein the aggregate component includes metadata identifying the respective configured component objects in the database.

12. The non-transitory machine-readable storage medium of claim 10, wherein the instructions are configurable to cause said processor to automatically generate presentation code for rendering the plurality of configured components in accordance with the spatial arrangement using the metadata and creating an aggregate component object in a database to maintain an association between the presentation code and the metadata.

13. The non-transitory machine-readable storage medium of claim 12, wherein the presentation code comprises Hypertext Markup Language (HTML) code for displaying the spatial arrangement of the plurality of configured components within the region of the web page, wherein the HTML code is configurable to utilize the metadata to invoke the respective configured component objects in the database and render each respective configured component object at a respective drag-and-drop location within the region associated with the respective configured component object.

14. The non-transitory machine-readable storage medium of claim 13, wherein the configured code comprises JavaScript for obtaining respective data from a respective selected data source associated with each configured component of the plurality of configured components.

15. The non-transitory machine-readable storage medium of claim 10, wherein the instructions are configurable to cause said processor to generate the aggregate component code comprising behavioral code configurable to dynamically update at least one of the plurality of configured components in response to an event associated with the browser application presenting the web page, wherein the page builder GUI display includes GUI elements configurable to define the event.

16. A system comprising:
a non-transitory machine-readable storage medium that stores software; and
a processor, coupled to the non-transitory machine-readable storage medium, to execute the software that implements a web page design service and that is configurable to:
provide a page builder graphical user interface (GUI) display at a client device over a network, wherein the page builder GUI display comprises a menu of configurable components for integration in a web page;
obtain, via a GUI element of the page builder GUI display, an indication of a primary data source on the network selected by a user for an aggregate component on the page builder GUI display;

obtain, from the page builder GUI display, a plurality of configured components from the menu of configurable components added to a region on the page builder GUI display corresponding to the aggregate component, wherein the plurality of configured components includes a web component associated with one or more fields of data available from the primary data source;

generate configured code for each configured component of the plurality of configured components in accordance with a respective configuration of the respective configured component of the plurality of configured components, wherein the respective configured code for the web component comprises behavioral code to obtain the one or more fields of the data available from the primary data source selected for the aggregate component;

identify a spatial arrangement of the plurality of configured components within the region;

generate aggregate component code configurable to cause a browser application to retrieve the data from the primary data source in accordance with a user configuration and generate each configured component of the plurality of configured components within the region in accordance with the spatial arrangement; and updating code for the web page to include a reference to the aggregate component code.

17. The system of claim 16, wherein the software is configurable to cause said processor to:

create, for each configured component of the plurality of configured components, a respective configured component object in a database maintaining an association between the respective configured component and the respective configured code for the respective configured component; and create an aggregate component object in the database, wherein the includes metadata identifying the respective configured component objects in the database.

18. The system of claim 16, wherein the software is configurable to cause said processor to automatically generate presentation code for rendering the plurality of configured components in accordance with the spatial arrangement using the metadata, wherein the aggregate component object maintains an association between the presentation code and the metadata.

19. The system of claim 18, wherein the presentation code comprises Hypertext Markup Language (HTML) code for displaying the spatial arrangement of the plurality of configured components within the region of the web page, wherein the HTML code is configurable to utilize the metadata to invoke the respective configured component objects in the database and render each respective configured component object at a respective drag-and-drop location within the region associated with the respective configured component object.

20. The system of claim 19, wherein the primary data source associated with the aggregate component is different from the respective selected data source associated with at least one of the plurality of configured components.

* * * * *